(12) United States Patent
Ikushima

(10) Patent No.: US 10,016,778 B2
(45) Date of Patent: Jul. 10, 2018

(54) DROPLET DISCHARGE DEVICE

(71) Applicant: MUSASHI ENGINEERING, INC., Tokyo (JP)

(72) Inventor: Kazumasa Ikushima, Tokyo (JP)

(73) Assignee: MUSASHI ENGINEERING, INC., Tokyo (JP)

( * ) Notice: Subject to any disclaimer, the term of this patent is extended or adjusted under 35 U.S.C. 154(b) by 0 days.

(21) Appl. No.: 15/560,044

(22) PCT Filed: Apr. 1, 2016

(86) PCT No.: PCT/JP2016/060888
§ 371 (c)(1),
(2) Date: Sep. 20, 2017

(87) PCT Pub. No.: WO2016/159338
PCT Pub. Date: Oct. 6, 2016

(65) Prior Publication Data
US 2018/0071766 A1  Mar. 15, 2018

(30) Foreign Application Priority Data

Apr. 3, 2015 (JP) ................................ 2015-077224

(51) Int. Cl.
*B05C 5/02* (2006.01)
*B05C 11/10* (2006.01)
(Continued)

(52) U.S. Cl.
CPC .......... *B05B 17/0653* (2013.01); *B05B 13/04* (2013.01); *B05C 5/0225* (2013.01);
(Continued)

(58) Field of Classification Search
None
See application file for complete search history.

(56) References Cited

U.S. PATENT DOCUMENTS 4,193,703 A * 3/1980 Sakmann ................. B41J 2/295
310/328
4,318,023 A * 3/1982 O'Neill .................. H02N 2/043
310/328
(Continued)

FOREIGN PATENT DOCUMENTS

JP         2002-282740 A    10/2002
JP            4786326 B2    10/2011
JP         2015-51399 A      3/2015

*Primary Examiner* — Binu Thomas
(74) *Attorney, Agent, or Firm* — Westerman, Hattori, Daniels & Adrian, LLP

(57) ABSTRACT

The droplet discharge device includes a liquid chamber which is in communication with a nozzle and to which a liquid material is supplied, a plunger having a tip portion that is thinner than the liquid chamber and that is moved back and forth in the liquid chamber, a piezoelectric actuator serving as a drive source that operates the plunger to be moved back and forth, a lever mechanism that increases a displacement of the piezoelectric actuator, a base having a mounting surface to which the piezoelectric actuator is mounted, and a discharge control device. The lever mechanism includes an arm that is operated to perform a swinging motion by the piezoelectric actuator, and a leaf spring including ends that are linked to a lower portion of the arm and to the base, and a plunger-linked portion in a central region thereof.

20 Claims, 15 Drawing Sheets

(51) Int. Cl.
*B05B 1/30* (2006.01)
*H01L 41/09* (2006.01)
*B05B 17/06* (2006.01)
*B05B 13/04* (2006.01)
*H02N 2/04* (2006.01)

(52) U.S. Cl.
CPC ........ *B05C 5/0291* (2013.01); *B05C 11/1002* (2013.01); *B05C 11/1026* (2013.01); *B05C 11/1034* (2013.01); *H02N 2/043* (2013.01); *B05B 1/304* (2013.01)

(56) References Cited

U.S. PATENT DOCUMENTS

| | | | |
|---|---|---|---|
| 4,629,926 A * | 12/1986 | Siegal | H01L 41/094 310/328 |
| 4,769,569 A * | 9/1988 | Stahlhuth | H02N 2/043 310/328 |
| 6,157,115 A * | 12/2000 | Hassler, Jr. | H02N 2/043 310/328 |
| 7,134,617 B2 | 11/2006 | Ikushima | |
| 9,346,075 B2 * | 5/2016 | Aguilar | B05C 5/0225 |
| 2004/0134996 A1 | 7/2004 | Kazumasa | |
| 2005/0236438 A1 * | 10/2005 | Chastine | B05C 5/001 222/504 |
| 2016/0193624 A1 | 7/2016 | Ikushima | |

\* cited by examiner

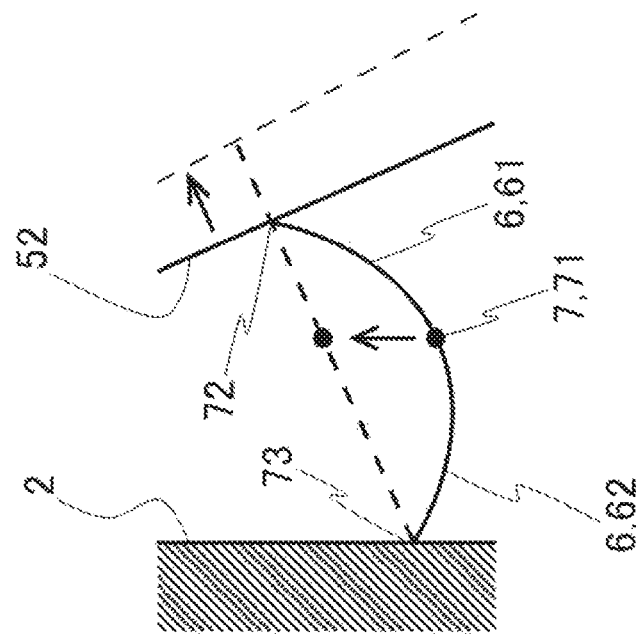
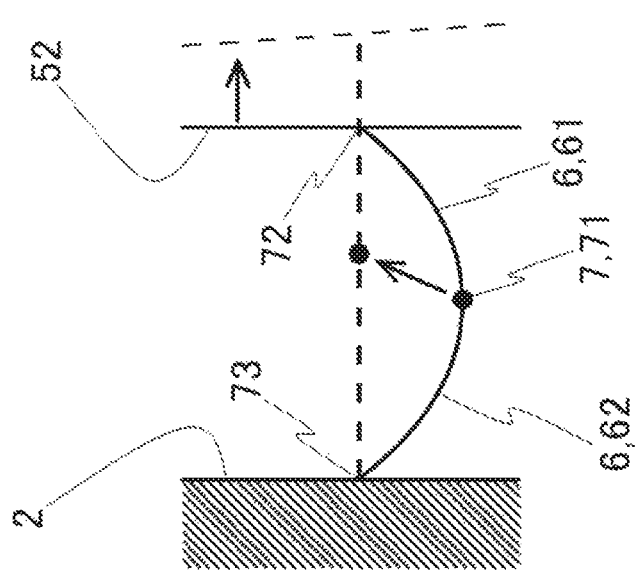

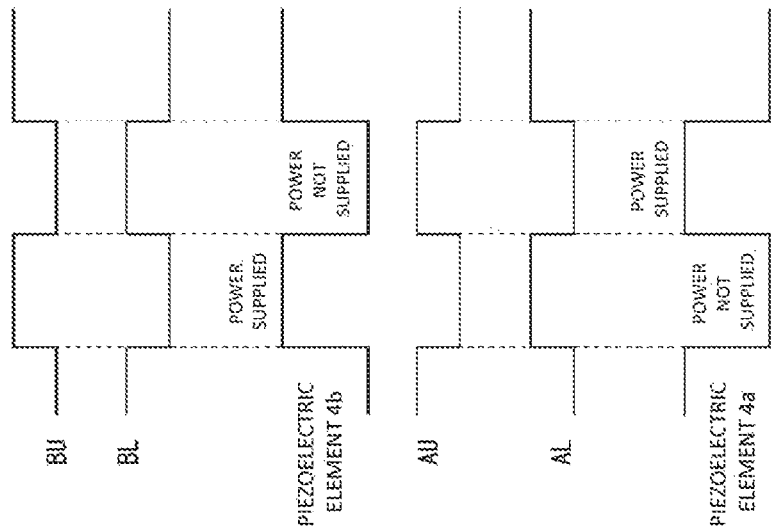
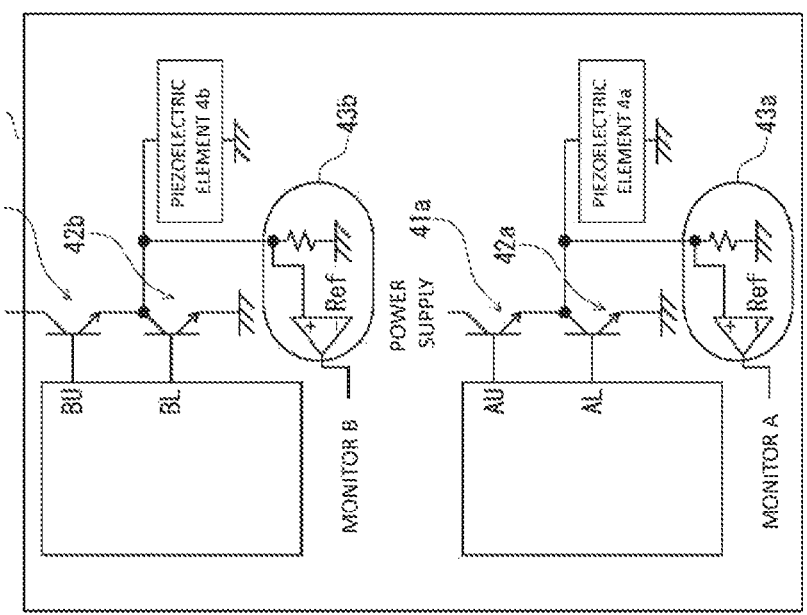

DROPLET DISCHARGE DEVICE

TECHNICAL FIELD

The present invention relates to a droplet discharge device including a plunger reciprocating within a liquid chamber that is in communication with a nozzle, a piezoelectric actuator, and a lever mechanism. The present invention further relates to an application apparatus equipped with the droplet discharge device. The term "plunger" used in this Description includes bar-like members called a needle, a rod, and a piston, for example.

BACKGROUND ART

Various techniques for discharging a small quantity of liquid material in the form of a droplet by employing a plunger reciprocating within a liquid chamber, which is in communication with a nozzle, have been proposed up to now. An actuator utilizing a motor, air, a piezoelectric element, for example, is used in many cases as a drive source for moving the plunger. Regarding a discharge device utilizing air pressure as the drive source, Patent Document 1, for example, proposed by the applicant discloses a discharge device in which a discharge port is opened when a plunger rod is moved backward with the aid of air pressure, and in which a droplet is discharged through the discharge port when the plunger rod is moved forward with the aid of resilient force of a spring.

In the discharge device of the type reciprocating the plunger by the spring and the air pressure, a desired distance through which the plunger is movable can be easily obtained, but it is difficult to hold a reciprocating speed of the plunger to be equal to or faster than a certain value because air has compressibility. On the other hand, in a discharge device of the type employing the piezoelectric actuator, because the operation of the piezoelectric element can be controlled with an electrical pulse signal, good reproducibility of a plunger stroke is ensured, and control of the operation of the piezoelectric element is easy.

Regarding a discharge device in which a needle is reciprocated by employing the piezoelectric actuator as the drive source, Patent Document 2, for example, discloses a droplet discharge device comprising a liquid chamber which is in communication with a discharge port and to which a liquid material is supplied, a needle having a tip portion that is moved back and forth in the liquid chamber, a drive device operating the needle to be moved back and forth, and a displacement increasing mechanism, the droplet discharge device discharging a droplet in a form flying out from the discharge port, wherein the drive device is constituted by an even number of drive devices arranged in a bilaterally symmetric relation, the displacement increasing mechanism includes a resiliently deformable U-shaped member having a lower portion to which the needle is linked, the needle is moved backward when the drive devices apply forces acting to move both end portions of the U-shaped member away from each other, and the needle is moved forward when the drive devices apply forces acting to move both the end portions of the U-shaped member in directions coming closer to each other.

In the droplet discharge device using the needle (plunger), since large ejection force can be applied to the liquid material by the plunger that is moved forward at a high speed, it is possible to discharge, in the form of a droplet, even such a liquid material as having high viscosity, which cannot be discharged with an ink jet device using a piezoelectric (electrostrictive) element to push and discharge ink in an ink chamber.

Patent Document 3 discloses a droplet ejection device comprising a casing that has an ejection hole formed at a tip thereof and a cylinder bore, a multilayered piezoelectric element that is arranged in the casing, and a plunger that is driven by the piezoelectric element serving as a drive source, and that is accommodated in the cylinder bore to be able to extend and contract through very small strokes, wherein the piezoelectric element is in the form of a rectangular parallelepiped that is fitted and attached integrally to an element holder, a resilient portion having a thin wall is formed in a part of the element holder to give the piezoelectric element with restoration force when the piezoelectric element is on the contraction side, an upper end portion of the element holder is fixed to the casing, and the plunger is formed at a lower end of the element holder.

The device disclosed in Patent Document 3 includes the plunger having the same diameter as the cylinder bore, and operates on the basis of the discharge principle of discharging the liquid material in the same quantity as the volume of the cylinder bore, which is reduced with forward movement of the plunger. The device operating on the basis of the above-mentioned discharge principle is not suitable for high-speed continuous discharge of several hundred or more shots per second for the reason that sliding friction is caused between a lateral peripheral surface of the plunger and an inner peripheral surface of the cylinder bore.

CITATION LIST

Patent Documents

Patent Document 1: Japanese Patent Laid-Open Publication No. 2002-282740
Patent Document 2: Japanese Patent Laid-Open Publication No. 2015-51399
Patent Document 3: Japanese Patent No. 4786326

SUMMARY OF INVENTION

Technical Problem

Recently, in a discharge device (dispenser) of the type reciprocating a plunger, there has been a demand for discharging a droplet to fly out in a smaller quantity than demanded so far. In the device disclosed in Patent Document 2, for example, although the needle having a relatively small diameter is reciprocated within the liquid chamber having a relatively large diameter, the liquid material can be discharged in a smaller quantity than the volume of the liquid chamber, which is reduced with the forward movement of the needle. In order to discharge the droplet to fly out in a very small quantity with the above-mentioned discharge method, the plunger is required to be moved forward through a certain distance.

From the viewpoint of ensuring the desired movable distance of the plunger in the discharge device using the piezoelectric actuator to reciprocate the plunger, it is necessary to dispose a displacement increasing mechanism for increasing an amount of displacement of the piezoelectric actuator. One conceivable solution of increasing the amount of displacement of the piezoelectric actuator is to increase the displacement of a piezoelectric element itself. However, that solution has the problem of increasing the size of the piezoelectric actuator and hence the size of the discharge device.

In addition, stacking piezoelectric elements into a multi-layered structure or employing a large number of piezoelectric elements leads to an increase of the device cost. Thus, there is a need for a discharge device including a displacement increasing mechanism capable of efficiently increasing the amount of displacement of the piezoelectric element with intent to reduce the device cost.

Moreover, because the piezoelectric actuator is susceptible to a shock load, another problem to be solved is how to mitigate the shock generated upon seating of the plunger, and how to realize a longer service lifetime of the expensive piezoelectric actuator. Still another problem to be solved resides in that friction particle generated from a tip of the plunger by a shock (seating shock) which is generated when the plunger is seated in the bottom of the chamber gives rise to contamination.

Taking into account the above-described situations, an object of the present invention is to provide a droplet discharge device which includes a piezoelectric actuator and an efficient displacement increasing mechanism, and which is capable of reducing the seating shock, and to provide an application apparatus equipped with the droplet discharge device.

Solution to Problem

The droplet discharge device according to the present invention comprises a liquid chamber which is in communication with a nozzle and to which a liquid material is supplied, a plunger having a tip portion that is thinner than the liquid chamber and that is moved back and forth in the liquid chamber, a piezoelectric actuator serving as a drive source that operates the plunger to be moved back and forth, a lever mechanism that increases a displacement of the piezoelectric actuator, a base having a mounting surface to which the piezoelectric actuator is mounted, and a discharge control device, wherein the lever mechanism includes an arm that is operated to perform a swinging motion by the piezoelectric actuator, and a leaf spring including ends that are linked to a lower portion of the arm and to the base, and a plunger-linked portion in a central region thereof, and wherein the leaf spring causes the plunger to perform a linear reciprocating motion with the swinging motion of the arm while a curvature of the leaf spring is changed.

In the droplet discharge device described above, the arm may be arranged such that a center line of the arm at least temporarily forms an acute angle with respect to an extension of a center line of the plunger during the swinging motion.

In the droplet discharge device described above, respective center lines of the plunger, the liquid chamber, and the nozzle may be positioned on the same linear line.

In the droplet discharge device described above, the leaf spring may be arranged in a state angularly bent or continuously curved such that a central portion of the leaf spring is projected toward the nozzle side, and a position of a linked portion between the leaf spring and the arm may be located above a position of a linked portion between the leaf spring and the base.

In the droplet discharge device described above, the leaf spring may be arranged in a state angularly bent or continuously curved such that a central portion of the leaf spring is projected toward the opposite side to the nozzle, and a position of a linked portion between the leaf spring and the arm may be located below a position of a linked portion between the leaf spring and the base.

In the droplet discharge device described above, the leaf spring may maintain an angularly-bent or continuously-curved state without fully extending when the lower portion of the arm under the swinging motion is located at a position farthest away from the linked portion between the base and the leaf spring.

In the droplet discharge device described above, the linked portion between the plunger and the leaf spring may be moved to reciprocate across a line perpendicularly extending from the linked portion between the base and the leaf spring toward a center line of the plunger.

In the droplet discharge device described above, a distance from the plunger-linked portion of the leaf spring to an end thereof on the base side may be set longer than a distance from the plunger-linked portion of the leaf spring to an end thereof on the arm side.

In the droplet discharge device described above, a center line of the arm may be arranged to form an acute angle with respect to an extension of a center line of the plunger at all times during the swinging motion.

In the droplet discharge device described above, the piezoelectric actuator may be constituted by a first piezoelectric element that moves a lower end portion of the arm in a direction closer to the base with extension of the first piezoelectric element, and by a second piezoelectric element that moves the lower end portion of the arm in a direction away from the base with extension of the second piezoelectric element. Preferably, the droplet discharge device further comprises a fixation rod that is arranged between the first piezoelectric element and the second piezoelectric element, and the arm is removably linked to the base by the fixation rod. More preferably, the first and second piezoelectric elements are mounted to the base through a swing mechanism for absorbing a shearing deformation that is generated in one of the first and second piezoelectric elements with extension of the other piezoelectric element.

In the droplet discharge device described above, the discharge control device may adjust forward and backward operations of the plunger by adjusting a rising time and a falling time of a pulse signal, which is used to drive the piezoelectric actuator, without changing an oscillation frequency of the pulse signal.

In the droplet discharge device described above, the arm may be arranged substantially parallel to the mounting surface.

In the droplet discharge device described above, the lever mechanism may increase a displacement of the piezoelectric actuator 3 to 20 times.

In the droplet discharge device described above, the plunger may be seated against an inner wall of the liquid chamber, the inner wall being positioned forward of the plunger when the plunger is brought into a fully advanced position, and the seated plunger may cut off fluid communication between the liquid chamber and the nozzle.

The droplet discharge device described above may further comprise a temperature sensor that measures a temperature of the piezoelectric actuator, and the discharge control device may have functions of storing a summed number of times that the piezoelectric actuator has been driven, predicting a lifetime of the piezoelectric actuator on the basis of both the summed number of times of actuator driving and a table representing a relation between a temperature and a lifetime coefficient, the table being stored in advance, and issuing an alarm when the lifetime is predicted to expire soon.

In the droplet discharge device described above, the discharge control device may have functions of monitoring a load applied to the plunger, and issuing an alarm when the monitored load exceeds a load range that is stored in advance.

A application apparatus according to the present invention comprises the above-described droplet discharge device according to the present invention, a worktable on which an application target is placed, a relatively moving device that moves the droplet discharge device and the application target relatively to each other, and a liquid-material supply source that supplies a liquid material to the droplet discharge device.

In the application apparatus described above, the droplet discharge device may be constituted by a plurality of droplet discharge devices.

Advantageous Effects of Invention

According to the present invention, since the plunger is moved by the piezoelectric actuator at a high speed, very small droplets can be discharged with high discharge accuracy at a high tact.

Furthermore, since the leaf spring absorbs shock that is generated upon the seating of the plunger, a longer service lifetime of the piezoelectric actuator can be realized, and the problem of contamination attributable to wear dust generated from the tip of the plunger can be solved.

Moreover, since the lever mechanism increases the amount of displacement of the piezoelectric actuator, a piezoelectric element having a smaller size can be employed.

BRIEF DESCRIPTION OF THE DRAWINGS

FIGS. 4(a) and 4(b) are an illustration referenced to explain relations among positions of both end portions of a leaf spring, an attachment angle of an arm, and a movement path of the plunger in Embodiment 1.

FIG. 9(a) is a circuit diagram of a piezoelectric element driver, and FIG. 9(b) is a graph depicting timings of supplying power to the piezoelectric elements.

DESCRIPTION OF EMBODIMENTS

The present invention relates to a droplet discharge device for discharging a variety of liquid materials, ranging from liquid materials having relatively low viscosity, such as water, solvents, and reagents, to liquid materials having relatively high viscosity, such as a solder paste, a silver paste, and an adhesive, in the form of flying droplets in very small quantities with high accuracy. Embodiments for carrying out the present invention will be described below.

Embodiment 1

<Discharge Device>

Figure 1:
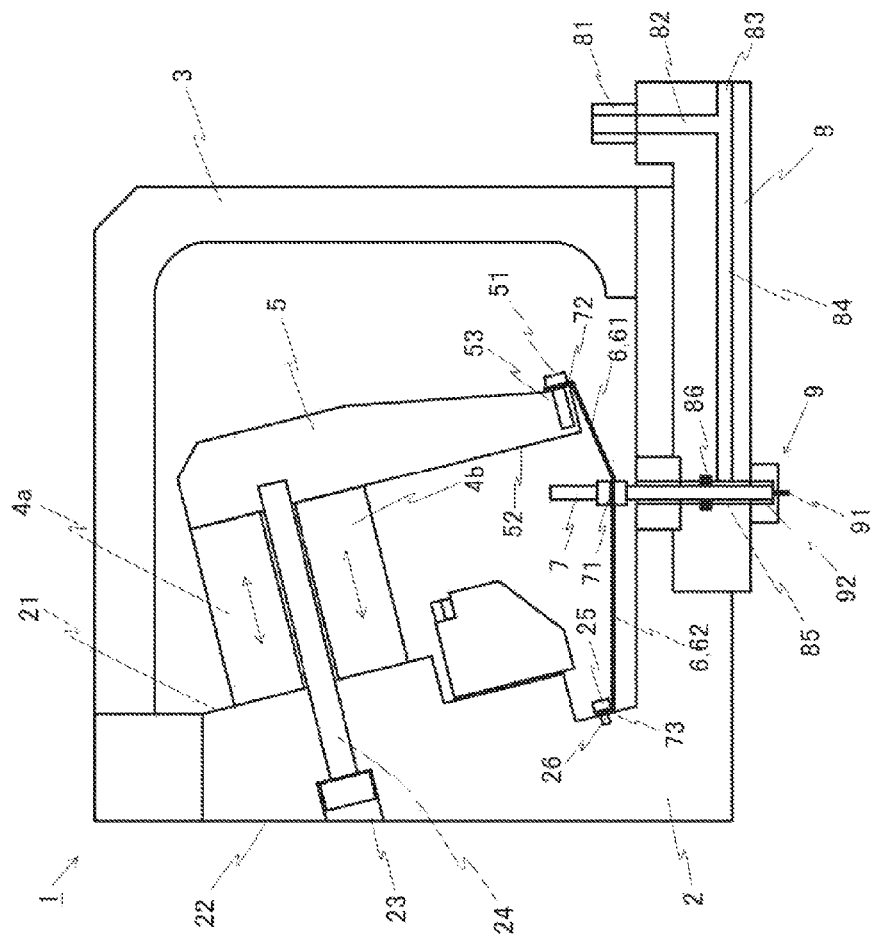
FIG. 1 is a side sectional view of a droplet discharge device according to Embodiment 1.

FIG. 1 is a side sectional view of a droplet discharge device 1 according to Embodiment 1.

The droplet discharge device 1 according to Embodiment 1 includes, as main components, a base 2, a frame 3, a piezoelectric actuator (4a, 4b), an arm 5, a leaf spring 6, a plunger 7, a liquid feed member 8, and a nozzle unit 9. For convenience of explanation, the side closer to the nozzle unit 9 is called the "lower side", and the side opposite to the nozzle unit 9 is called the "upper side" in some cases.

The base 2 is a member having a substantially L-shape when viewed from a side, and it includes a mounting surface 21 and a screw bore 23, the screw bore 23 interconnecting the mounting surface 21 and a rear surface 22. While, in the illustrated embodiment, the base 2 is constituted by one member, a plurality of members may be combined to constitute the base 2 having the substantially L-shape when viewed from a side.

The mounting surface 21 is a flat surface formed to incline at a predetermined angle with respect to a vertical line. The piezoelectric actuator (4a, 4b) is directly or indirectly mounted to the mounting surface 21 in a fixed state. The mounting surface 21 is not always required to be a flat surface (namely, it may include irregularities) insofar as the piezoelectric actuator (4a, 4b) can be arranged at the predetermined angle with respect to the vertical line. The angle formed by the mounting surface 21 (and the arm 5) and the vertical line is preferably an acute angle. Generally, the above angle is assumed to be set within a range of, for example, 10 to 45 degrees in many cases. The reason why the mounting surface 21 is arranged at an angle with respect to the vertical line resides in converting a swinging motion of the arm 5 to a linear reciprocating motion of the plunger 7. However, the technical concept of the present invention can be implemented even in an embodiment in which the mounting surface 21 does not form an angle with respect to the vertical line (namely, the mounting surface 21 is parallel to the vertical line). The technical concept of the present invention can be further implemented even in an embodiment in which the arm 5 subjected to the swinging motion does not always form an acute angle with respect to the vertical line (namely, the arm 5 takes a posture parallel to the vertical line temporarily during the swinging motion). Such a point will be described in detail later.

A stepped screw groove is formed in the screw bore 23, and a fixation rod 24 having threads formed in its tip portion is fixedly held in the stepped screw groove. By inserting and screwing the fixation rod 24 into the screw bore 23, the piezoelectric actuator (4a, 4b) can be fixedly held in a state where the piezoelectric actuator is pressed by the arm 5. The fixation rod 24 is removably held in the screw bore 23 such that the piezoelectric actuator (4a, 4b) can be easily replaced when the piezoelectric actuator comes to the end of its lifetime. The fixation rod 24 is an elongate member, and the shape of the fixation rod 24 is not limited to the illustrated one.

The frame 3 is a member having a substantially L-shape when viewed from a side, and it constitutes a frame body in combination with the base 2. Piezoelectric elements 4a and 4b, the arm 5, the leaf spring 6, the plunger 7, and so on are arranged within the frame body, and the frame body is covered with two lateral members (not illustrated). As a result, a casing in the form of a rectangular parallelepiped is constituted.

The piezoelectric actuator is constituted by arranging two piezoelectric (electrostrictive) elements 4a and 4b in an opposing state with a spacing kept between the two piezoelectric elements to allow insertion of the fixation rod 24 through the spacing, the piezoelectric elements 4a and 4b having the same specifications and being each extended and contracted in a laminating direction (direction denoted by an arrow in FIG. 1) with application of a voltage. The piezoelectric elements 4a and 4b in this embodiment are each a rod-like multilayered element that is constituted, for example, by stacking piezoelectric ceramic materials with a high distortion rate, inner electrodes, outer electrodes, and insulators. An amount of displacement of the piezoelectric element in a thickness direction is, for example, about 5 to 200 μm. While two piezoelectric elements are used in the illustrated embodiment, the number of piezoelectric elements is not limited to two, and the element number may be one or three or more. When it is desired to employ one piezoelectric element, one of the piezoelectric elements 4a and 4b in this embodiment is preferably replaced with a resilient member. As an alternative, one of the piezoelectric elements 4a and 4b may be simply omitted when the droplet discharge device has a structure including a member, like the fixation rod 24, which acts as a fulcrum point of the swinging motion of the arm 5. From the viewpoint of finely controlling the arm 5, however, the piezoelectric actuator is preferably constituted arranging an even number of piezoelectric elements in an opposing relation. In the case of employing four piezoelectric elements, for example, two among the four piezoelectric elements are arranged at the position of the piezoelectric element 4a, and the remaining two piezoelectric elements are arranged at the position of the piezoelectric element 4b.

As illustrated in FIG. 2, the plunger 7 can be moved forward by causing the piezoelectric element 4a to extend and by causing the piezoelectric element 4b to be kept stationary or to contract. On the other hand, the plunger 7 can be moved backward by causing the piezoelectric element 4b to extend and by causing the piezoelectric element 4a to be kept stationary or to contract. Displacements of the piezoelectric elements 4a and 4b are increased, for example, 3 to 20 times (preferably 5 to 20 times) by a lever mechanism that is constituted by the arm 5 and the leaf spring 6, and are then transmitted to the plunger 7. Timings of supplying power to the piezoelectric elements 4a and 4b will be described later.

The arm 5 is an elongate member made of a metal material, for example, and is mounted to the base 2 in a state where a bottom surface 52, which is given as a flat surface, and a center line of the arm 5 are substantially parallel to the mounting surface 21. Here, the wording "substantially parallel" stands for a positional relation that the center line of the arm 5 becomes temporarily parallel to the mounting surface 21 at some position between a farthest position and a closest position relative to the mounting surface 21 (namely, during the swinging motion of the arm). Furthermore, in this embodiment, the arm 5 is fixedly held in a state pressing the piezoelectric elements 4a and 4b by inserting and screwing the fixation rod 24 into a screw hole that is formed in the bottom surface 52 of the arm 5. Another screw hole into which a fixation screw 51 is screwed is formed in a lower end portion of the arm 5. The screw hole into which the fixation screw 51 is screwed is not necessarily required to be formed in the lower end portion of the arm, and that screw hole is just required to be positioned in a lower portion of the arm 5 (namely, lower than a center of the arm in its lengthwise direction). Moreover, the bottom surface 52 of the arm 5 is not necessarily required to be a flat surface, and it may include irregularities.

The arm 5 fixedly held at its upper portion by the fixation rod 24 is operated to perform the swinging motion about a fulcrum point defined near the fixation rod 24, and the swinging motion is converted to the linear reciprocating motion of the plunger 7 through the leaf spring 6. In this embodiment, the swinging motion of the arm 5 can be converted to the linear reciprocating motion of the plunger 7 by arranging the arm 5 in a state where the center line of the arm 5 forms an acute angle with respect to an extension of a center line of the plunger 7.

In this embodiment, the arm 5 is arranged such that the center line of the arm 5 always forms an acute angle with respect to the extension of the center line of the plunger 7 at any stroke point of the swinging motion. However, the swinging motion of the arm 5 can also be converted to the linear reciprocating motion of the plunger 7 in another embodiment in which, unlike this embodiment, the center line of the arm 5 temporarily becomes parallel to the extension of the center line of the plunger 7 during the swinging motion, by arranging the leaf spring 6 such that respective heights of both end portions (linked portions 72 and 73) of the leaf spring 6, which has an angularly-bent or continuously-curved shape, are different from each other through an appropriate distance.

The leaf spring 6 is fixedly held in a state where the linked portion 72 to the arm 5 is positioned at a level higher than the linked portion 73 to the base 2. More specifically, a screw hole 53 through which the fixation screw 51 is inserted is formed near one end portion of the leaf spring 6, and the one end portion of the leaf spring 6 is fixed to the lower end portion (lower end or thereabout) of the arm 5 by the fixation screw 51 that is screwed into the screw hole 53. A screw hole 26 through which a fixation screw 25 is inserted is formed near the other end portion of the leaf spring 6, and the other end portion of the leaf spring 6 is fixed to the base 2 by the fixation screw 25. A plunger fixture 71 for fixing the plunger 7 is attached to a central portion of the leaf spring 6 in its lengthwise direction (the central portion being not limited to a center of the plunger and including a portion covering a certain range from the center), and the plunger 7 is inserted through and fixed to a through-hole that is formed at a center of the plunger fixture 71 in its widthwise direction. A length of an arm-side portion 61 of the leaf spring is set to be shorter than that of a base-side portion 62 of the leaf spring in order to increase linearity of the plunger 7 (as described in detail later). A fixture for fixing the end portion of the leaf spring 6 is not limited to a screw, such as the fixation screw 51 or the fixation screw 26, and suitable one of known fixing means may also be optionally used. Furthermore, instead of using the plunger fixture 71, the plunger 7 may be bonded or welded to the leaf spring. As an alternative, the plunger 7 and the leaf spring 6 may be formed integrally.

Because the lower end of the arm 5 is positioned at a level higher than the plunger fixture 71 and the fixation screw 25 is positioned substantially at the same height as the plunger fixture 71, the leaf spring 6 is angularly bent near a position where the plunger fixture 71 is attached to the leaf spring 6, and a central portion of the leaf spring 6 is projected downward (toward the nozzle side) (namely, the central portion of the leaf spring 6 is projected toward the nozzle side with respect to a linear line interconnecting the linked portion 72 between the leaf spring 6 and the arm 5 and the linked portion 73 between the leaf spring 6 and the base 2). In this embodiment, the arm-side portion 61 of the leaf spring and the base-side portion 62 of the leaf spring have different curvatures from each other.

The leaf spring 6 in this embodiment is angularly bent near the attached position of the plunger fixture 71. Unlike this embodiment, however, the leaf spring 6 having a circular-arc shape curved to project downward (toward the nozzle side) without including any angularly bent portion may be used instead (see FIG. 4; FIG. 4 illustrates the case where the curvature is substantially the same between the arm-side portion 61 of the leaf spring and the base-side portion 62 of the leaf spring, but the curvature may be different between the arm-side portion 61 of the leaf spring and the base-side portion 62 of the leaf spring depending on cases). Moreover, the swinging motion of the arm 5 can be converted to the linear reciprocating motion of the plunger 7 even when the leaf spring 6 is arranged in such an angularly-bent or continuously-curved state that the central portion of the leaf spring 6 is projected upward (toward the opposite side to the nozzle) (namely, even when the central portion of the leaf spring 6 is projected toward the opposite side to the nozzle with respect to the linear line interconnecting the linked portion 72 between the leaf spring 6 and the arm 5 and the linked portion 73 between the leaf spring 6 and the base 2) (see Embodiment 3 described later).

In the present embodiment, a bending or curving direction of the leaf spring 6 is avoided from changing into a reversed direction during the swinging motion of the arm 5 with such a configuration that the leaf spring 6 maintains an angularly-bent or continuously-curved state without fully extending at any stroke point of the swinging motion of the arm 5. However, the technical concept of the present invention can also be implemented even in an embodiment in which the leaf spring 6 is fully extended when the lower portion of the arm 5 is positioned at a location farthest away from the linked portion between the base 2 and the leaf spring 6.

The plunger 7 is a rod-like member vertically arranged and extending straightly. The plunger 7 is fixed to a central portion of the leaf spring 6 by the plunger fixture 71, and is operated to reciprocate in the vertical direction. The plunger 7 is inserted into a plunger chamber 85 formed inside a liquid feed member and extending straightly, and is arranged such that a tip portion of the plunger 7 is positioned in a liquid chamber 92 defined in a nozzle unit 9. In this embodiment, the plunger 7, the plunger chamber 85, the liquid chamber 92, and the nozzle 91 are arranged in a state where their center lines are all positioned on the vertical line. However, the plunger 7, the plunger chamber 85, the liquid chamber 92, and the nozzle 91, which is opened downward, may be arranged in a state where their center lines form an angle with respect to the vertical line. Stated in another way, the droplet discharge device capable of realizing the advantageous effects of the present invention in a desired fashion can be provided insofar as the center lines of the plunger 7, the plunger chamber 85, the liquid chamber 92, and the nozzle 91 are positioned on the same linear line.

An annular sealing member 86 for preventing a rise of the liquid material is disposed near a center of the plunger chamber 85. Because the plunger chamber 85 has a larger diameter than the plunger 7, a lateral peripheral surface of the reciprocating plunger 7 will not come into contact with an inner peripheral surface of the plunger chamber 85. It is to be noted that the plunger 7 is not necessarily required to have the same diameter (same width) over an entire range from an upper portion to a lower portion (tip portion) thereof, and that the plunger 7 may have a stepped portion insofar as the lateral peripheral surface of the plunger 7 will not come into contact with the inner peripheral surface of the plunger chamber 85.

Because the plunger 7 can be operated to reciprocate without causing sliding friction, the plunger 7 can be moved forward at a high speed to apply inertial force to the liquid material positioned in front of the plunger 7, thereby discharging, in the form of a droplet, the liquid material in a smaller quantity than a volume displaced by the plunger 7. In this embodiment, the forward movement of the plunger 7 is stopped by causing a tip of the plunger 7 to be seated against a valve seat that is constituted by an inner wall surface of the liquid chamber 92. However, the technical concept of the present invention can also be implemented in an embodiment in which the tip of the plunger 7 moving forward is stopped near the valve seat, and in which the droplet is discharged without causing the plunger 7 to be seated against the valve seat.

While a sectional shape of each of the liquid chamber and the plunger is preferably circular, it is just needed that at least the tip portion of the plunger is formed to be thinner than the liquid chamber. Thus, the liquid chamber and the plunger may each have a polygonal or elliptical sectional shape. Moreover, the sectional shapes of the liquid chamber and the plunger are not always required to be similar to each other.

In this embodiment, because of the plunger 7 being fixed to the leaf spring 6, even when the tip of the plunger 7 is seated against the inner wall surface of the liquid chamber 92, the leaf spring 6 absorbs shock generated upon the seating of the plunger tip. Such an action of mitigating the seating shock by the leaf spring 6 provides significant advantageous effects of prolonging the service lifetime of the piezoelectric actuator that is susceptible to the shock, and of lessening wear of the tip of the plunger 7.

The plunger 7 is made of, for example, a metal material, a ceramic material, or a resin material, which has high corrosion resistance. The tip of the plunger 7 may have any suitable shape. For example, a flat surface, a spherical shape, or a shape having a boss at an end of the tip is disclosed here as the shape of the plunger tip.

The liquid feed member 8 is a member extending horizontally, and a joint 81 for coupling the liquid feed member 8 to a not-illustrated storage container (syringe) is disposed near an end portion of the liquid feed member 8. The joint 81 is arranged to extend in the vertical direction, and the syringe is attached to the joint 81 in a positional relation parallel to an adjacent lateral surface of the frame 3. An inflow channel 82 in communication with the joint 81, an air purge channel 83, a supply channel 84, these two channels being branched from the inflow channel 82, and the plunger chamber 85 are formed inside the liquid feed member 8. The air purge channel 83 is opened to be communicated with atmospheric air at a time when the liquid material is filled into the supply channel 84, the plunger chamber 85, and the liquid chamber 92, while the communication of the air purge channel 83 with atmospheric air is cut off by a closing plug (not illustrated in FIG. 1; see 87 in FIGS. 6 and 7) when the liquid material is discharged. The liquid material within the syringe is pressurized by compressed gas, and is supplied to the liquid chamber 92 through the joint 81, the inflow channel 82 and the supply channel 84.

It is to be noted that the liquid material may also be supplied to the liquid chamber 92 by employing suitable one of known liquid feed means, such as a pump.

The nozzle unit 9 includes the nozzle 91 and the liquid chamber 92.

The nozzle 91 is a circular cylindrical member in which a discharge channel is formed. A discharge port is formed at a forward end of the nozzle 91, and a backward end of the nozzle 91 is in communication with the liquid chamber 92. A shape of the nozzle 91 is not limited to the illustrated one. In some cases, the nozzle 91 may be constituted in the form of an orifice, for example.

An opening in communication with the discharge channel of the nozzle 91 is formed in an inner wall bottom surface of the liquid chamber 92, and the opening is opened and closed by the plunger 7 departing away from and seating against the inner wall bottom surface of the liquid chamber 92, respectively. In other words, the inner wall bottom surface of the liquid chamber 92 around the opening, against which the plunger 7 is seated, constitutes a valve seat. The liquid chamber 92 extending straightly has the same diameter as the plunger chamber 85. Thus, since the diameter of the liquid chamber 92 is larger than that of the plunger 7, the lateral peripheral surface of the reciprocating plunger 7 will not come into contact with an inner peripheral surface of the liquid chamber 92. In the liquid chamber 92 and the plunger chamber 85, the liquid material is filled up to a position near the sealing member 86.

The nozzle unit 9 may be equipped with a temperature adjustment mechanism for heating the liquid material within the liquid chamber 92 to a predetermined temperature.

In this embodiment, within the plunger chamber 85 and the liquid chamber 92, the lateral peripheral surface of the plunger 7 is not contacted with any other members other than the annular sealing member 86. Furthermore, during the movement of the plunger 7, the supply channel 84 and the liquid material positioned forward of the plunger 7 are held in fluid communication with each other.

A guide member coming into contact with the lateral peripheral surface of the plunger 7 and suppressing wobbling of the plunger 7 during the reciprocating motion of the plunger 7 may be disposed, as required, above and/or below the sealing member 86. Also when the guide member is disposed, the supply channel 84 and the liquid material positioned forward of the plunger 7 are preferably held in fluid communication with each other during the movement of the plunger 7. In the case of disposing the guide member, since the linear motion of the plunger 7 is ensured by the guide member, the leaf spring 6 and the plunger 7 are not necessarily required to be tightly fixed to each other by the plunger fixture 71 (namely, the plunger fixture 71 may be designed to provide a relatively large play).

<Operation>

Operations of the piezoelectric actuator (4a, 4b), the lever mechanism (5, 6), and the plunger 7 will be described below.

FIG. 2 is a schematic side view referenced to explain the reciprocating motion of the plunger 7. In FIG. 2, components appearing different from the corresponding components in FIG. 1 are illustrated in the simplified forms in comparison with the configurations of the components in FIG. 1.

Figure 2A:
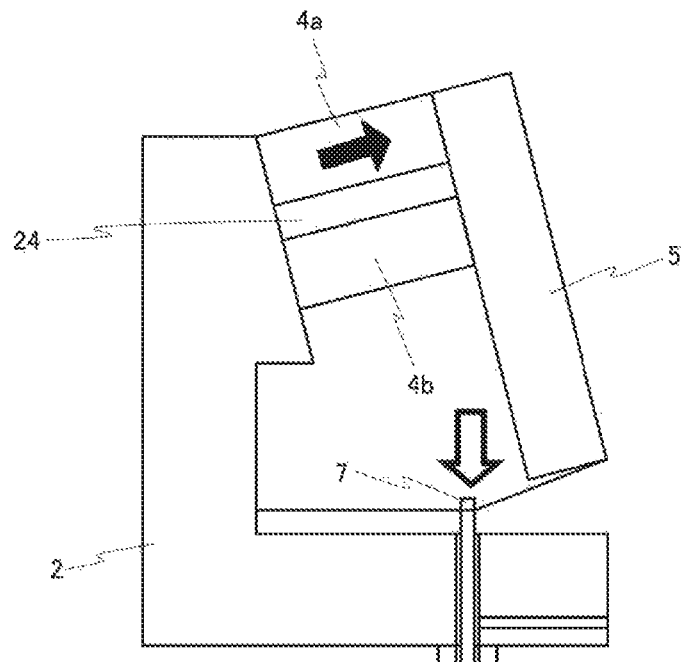
FIGS. 2(a) and 2(b) are a schematic side view referenced to explain a reciprocating motion of a plunger.

As illustrated in FIG. 2(a), with extension of the piezoelectric element 4a, the arm 5 is caused to swing with the fixation rod 24 being a fulcrum point in such a manner that the upper end portion of the arm 5 departs away from the base 2 and the lower end portion of the arm 5 comes closer to the base 2, whereby the plunger 7 is moved downward in the vertical direction. In the following description, the position of the arm 5 when the reciprocating plunger 7 is moved to a fully advanced position is called the "closest position" in some cases.

Figure 2B:
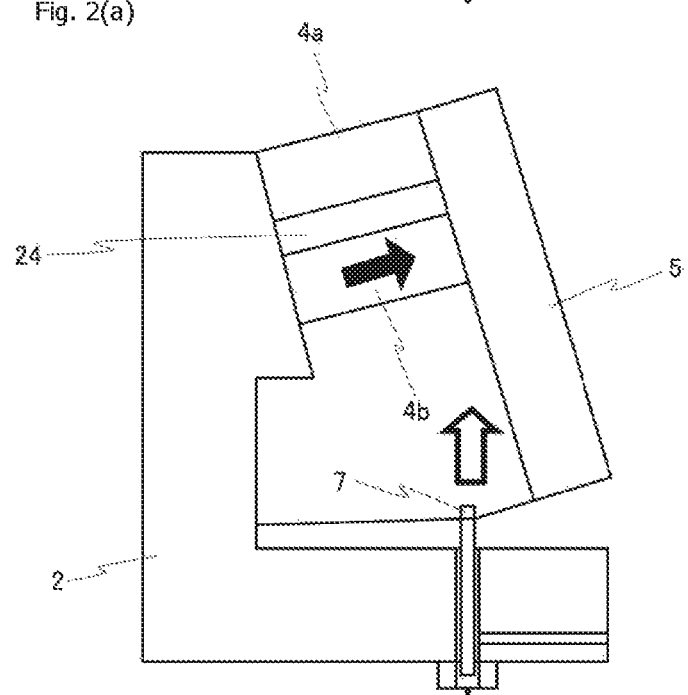

As illustrated in FIG. 2(b), with extension of the piezoelectric element 4b, the arm 5 is caused to swing with the fixation rod 24 being a fulcrum point in such a manner that the upper end portion of the arm 5 comes closer to the base 2 and the lower end portion of the arm 5 departs away from the base 2, whereby the plunger 7 is moved upward in the vertical direction. In the following description, the position of the arm 5 when the reciprocating plunger 7 is moved to a fully retracted position is called the "farthest position" in some cases.

Thus, since the arm 5 swings back and forth with the fixation rod 24 being a fulcrum point, displacements of the piezoelectric elements 4a and 4b are increased and then transmitted to the plunger 7. With one reciprocating stroke of the plunger 7, one droplet is discharged from the discharge port of the nozzle 91.

Figure 3:
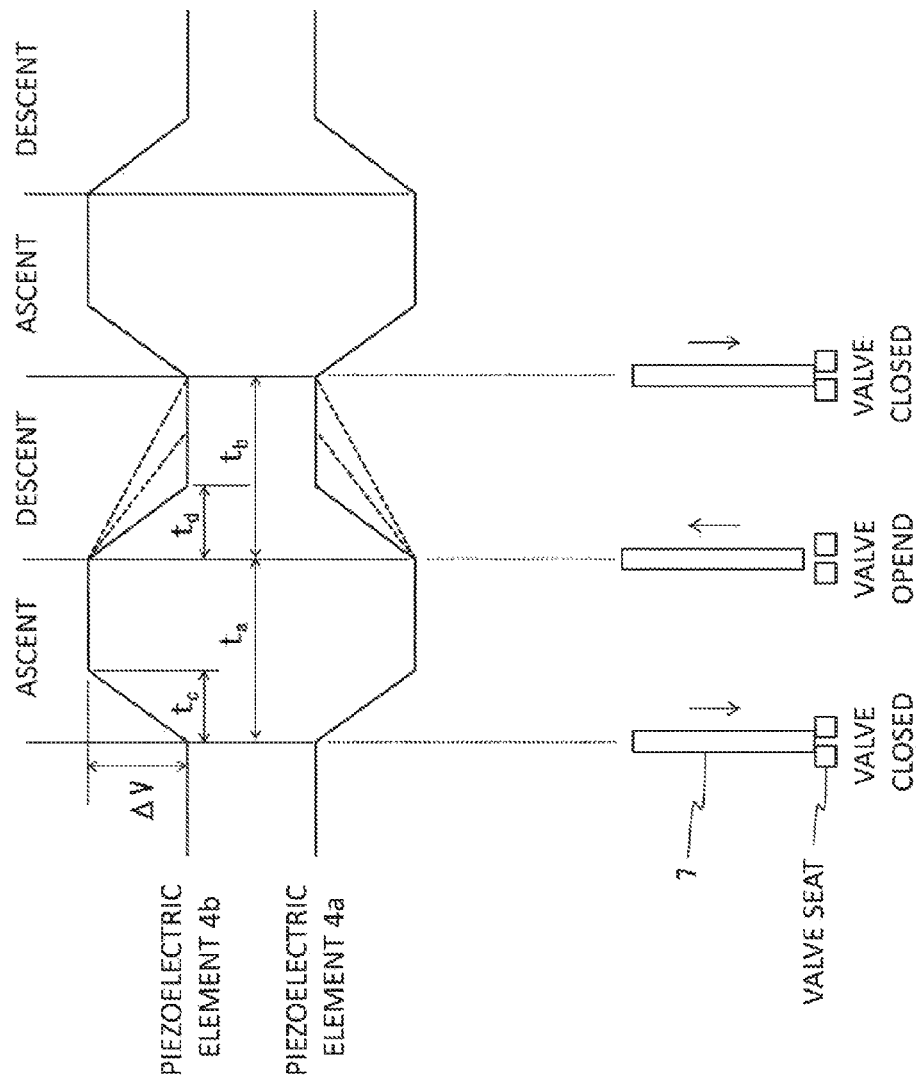
FIG. 3 is a chart referenced to explain the movement of the plunger and timings of applying electrical signals to piezoelectric elements.

As illustrated in FIG. 3, when the plunger 7 is moved backward, an electrical signal is applied to the piezoelectric element 4b, thus causing the piezoelectric element 4b to extend. From the viewpoint of moderating transition from the contracted state to the extended state, the application of the electrical signal to the piezoelectric element 4b may be performed in a manner of initially applying an electrical signal for rising. At that time, the piezoelectric element 4a is in the contracted state where no electrical signal is applied or an electrical signal for falling to make transition from the extended state to the contracted state is applied to the piezoelectric element 4b.

When the plunger 7 is moved forward, an electrical signal is applied to the piezoelectric element 4a, thus causing the piezoelectric element 4a to extend. From the viewpoint of moderating transition from the contracted state to the extended state, the application of the electrical signal to the piezoelectric element 4a is preferably performed in a manner of initially applying an electrical signal for rising. At that time, the piezoelectric element 4b is in the contracted state where no electrical signal is applied or an electrical signal for falling to make transition from the extended state to the contracted state is applied to the piezoelectric element 4a.

A rising time tc in the backward movement and a falling time td in the forward movement are set to optimum values depending on the properties of the liquid material and the size of the droplet to be formed. Discharge accuracy can be improved through adjustment of tc and td, while frequencies of pulses applied to the piezoelectric elements 4a and 4b are held constant. The amounts of displacements of the piezoelectric elements 4*a* and 4*b* can be each adjusted with an applied voltage ΔV, and they are set to optimum values depending on the properties of the liquid material and the size of the droplet to be formed.

Relations among positions of both the end portions (linked portions 72 and 73) of the leaf spring 6, an attachment angle of the arm 5, and a movement path of the plunger 7 will be described below with reference to FIG. 4. FIG. 4 is a schematic illustration on an assumption that the base 2 is represented by a vertical line. In FIG. 4, it is further assumed that the center line of the plunger 7 extends in the vertical direction, and that the bottom surface 52 of the arm is a flat surface (the reference sign 52 in FIG. 4 may be regarded as representing the center line of the arm 5).

FIG. 4(*a*) is an illustration referenced to explain a backward movement path of the plunger 7 when both the end portions (linked portions 72 and 73) of the leaf spring 6 are positioned at the same height and when the base 2 and the bottom surface 52 of the arm are parallel to each other at the closest position (namely, when the arm 5 is parallel to the vertical line at the closest position). In this case, when the lower end portion of the arm 5 is moved to swing in a direction away from the base 2 about the fulcrum point defined at the vicinity of the fixation rod 24, the plunger 7 is moved upward obliquely. In other words, the plunger 7 cannot be moved upward in the vertical direction. However, as described later with reference to FIG. 15, even when the base 2 and the bottom surface 52 of the arm temporarily become parallel to each other during the swinging motion of the arm, the plunger 7 can also be caused to move in the vertical direction by setting the heights of both the end portions (linked portions 72 and 73) of the leaf spring 6 to levels different from each other through an appropriate distance.

FIG. 4(*b*) is an illustration referenced to explain a backward movement path of the plunger 7 when the heights of both the end portions (linked portions 72 and 73) of the leaf spring 6 are set to levels different from each other through an appropriate distance and when the base 2 and the bottom surface 52 of the arm 5 form an angle (namely, when the arm 5 forms an acute angle with respect to the vertical line, or when the arm 5 forms an acute angle with respect to the extension of the center line of the plunger 7). In this case, when the lower end portion of the arm 5 is moved to swing in a direction away from the base 2 about the fulcrum point defined at the vicinity of the fixation rod 24, the plunger 7 is moved upward in the vertical direction.

Thus, the plunger 7 can be operated to reciprocate in the vertical direction with the swinging motion of the arm 5 about the fulcrum point defined at the vicinity of the fixation rod 24 by setting the heights of both the end portions (linked portions 72 and 73) of the leaf spring 6 to levels different from each other through an appropriate distance, and by arranging the arm 5 to form an acute angle with respect to the vertical line (or with respect to the extension of the center line of the plunger 7). During the swinging motion, the arm 5 is not required at all times to form an acute angle with respect to the vertical line (or with respect to the extension of the center line of the plunger 7). The technical concept of the present invention can also be implemented even in an embodiment in which the arm 5 temporarily become parallel to the vertical line (or to the extension of the center line of the plunger 7) (details of such an embodiment will be described later with reference to FIG. 15).

The reason why the length of the base-side portion 62 of the leaf spring is set to be longer than that of the arm-side portion 61 of the leaf spring in this embodiment is described here.

If it is assumed that the leaf spring 6 does not have properties of flexing due to resiliency, a linked portion between the plunger 7 and the leaf spring 6 (i.e., a portion provided by the fixture 71) is moved along a circular-arc path with the linked portion 73 between the base 2 and the leaf spring 6 being a fulcrum point. Although the circular-arc path is actually converted to a linear path with the flexing properties of the leaf spring 6 due to resiliency, the circular-arc path is preferably set as far as close to or overlapped with the center line of the plunger 7 (i.e., the reciprocating direction of the plunger 7).

Increasing the distance from the linked portion 73 between the base 2 and the leaf spring 6 to the linked portion 72 between the plunger 7 and the leaf spring 6 is effective in making the circular-arc path closer to the linear path. Stated in another way, it is preferable to set the length of the base-side portion 62 of the leaf spring (i.e., the distance between the fixture 71 and the linked portion 73) to be longer than that of the arm-side portion 61 of the leaf spring (i.e., the distance between the fixture 71 and the linked portion 72). With that setting, the above-mentioned circular-arc path can be efficiently made closer to the linear path.

Designing the plunger fixture 71 so as to reciprocate across a horizontal line extending from the linked portion 73 between the base 2 and the leaf spring 6 (namely, across a line perpendicularly extending from the linked portion 73 toward the center line of the plunger 7) is also an effective means for efficiently making the circular-arc path closer to the linear path.

The above description is merely to explain one example of the droplet discharge device 1. Thus, respective forms and positions of and respective angles at a linked portion between the base 2 and the piezoelectric actuator (4*a*, 4*b*), a linked portion between the piezoelectric actuator (4*a*, 4*b*) and the arm 5, the linked portions (72, 73) at both the ends of the leaf spring 6, and the linked portion between the plunger 7 and the leaf spring 6, as well as the bending or curving shape and direction of the leaf spring 6 can be changed as appropriate insofar as the plunger 7 is able to reciprocate linearly.

<Application Apparatus>

Figure 5:
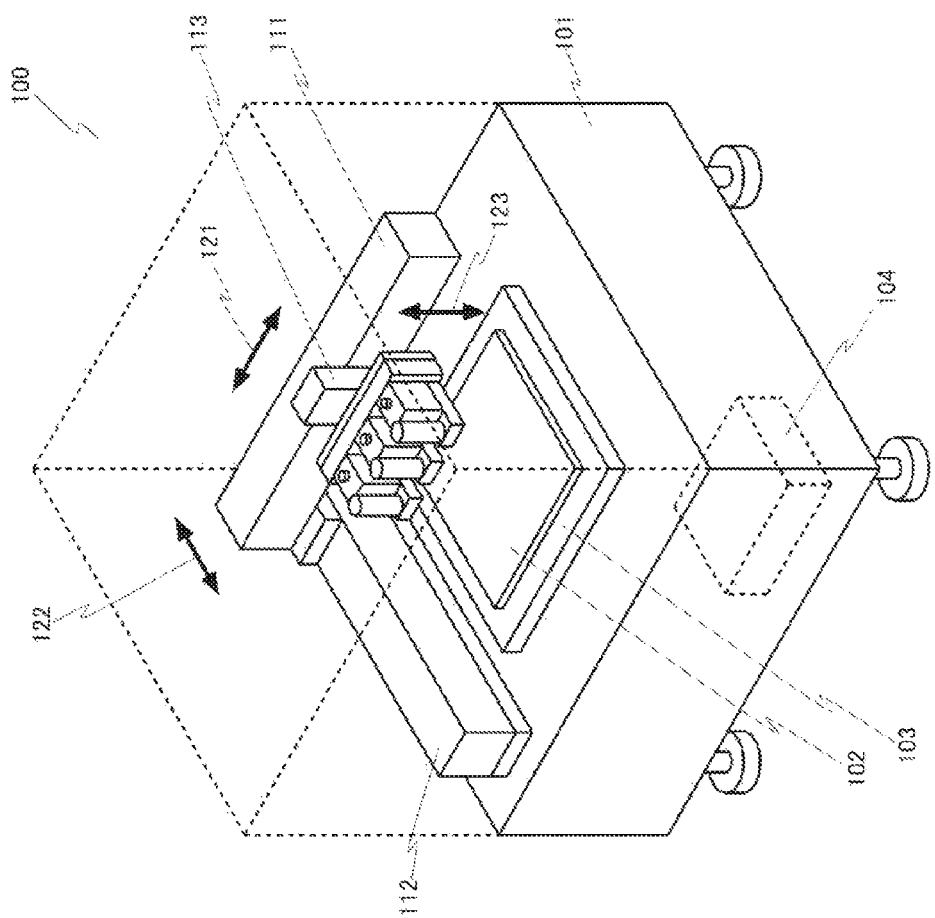
FIG. 5 is a perspective view of an application apparatus equipped with the droplet discharge device according to Embodiment 1.

As illustrated in FIG. 5, the droplet discharge device 1 is mounted to a desktop application apparatus 100, and is used in work of applying the liquid material onto a workpiece while the droplet discharge device 1 and a worktable 103 are relatively moved by XYZ-axis drive devices (111, 112, 113). The illustrated application apparatus 100 includes a bench 101, the worktable 103 on which a workpiece 102, i.e., an application target, is placed, the X drive device 111 for relatively moving the droplet discharge device 1 and the worktable 103 in an X direction 121, the Y drive device 112 for relatively moving the droplet discharge device 1 and the worktable 103 in a Y direction 122, the Z drive device 113 for relatively moving the droplet discharge device 1 and the worktable 103 in a Z direction 123, a not-illustrated dispenser controller (discharge control unit) for supplying compressed gas, which is delivered from a not-illustrated compressed gas source, to the storage container (syringe) under desired conditions, and an application operation control unit 104 for controlling operations of the XYZ drive devices (111, 112, 113). In the application apparatus 100, as represented by dotted lines, a space above the bench is preferably covered with a protective cover to prevent particles and dust generated in the surroundings from reaching the workpiece 102.

The XYZ drive devices (111, 112, 113) are constituted, for example, by known combinations of XYZ-axis servomotors and ball screws, and they can move the discharge port of the droplet discharge device 1 to a desired position of the workpiece at an desired speed. While three droplet discharge devices 1 are mounted to the application apparatus in FIG. 5, the number of the droplet discharge devices to be mounted is not limited to three in the illustrated example, and it may be one or plural number such as 2 or 4. Furthermore, while the three droplet discharge devices 1 are mounted to one Z drive device 113 in FIG. 5, the Z drive device 113 may be disposed in the same number as the droplet discharge devices 1 (three in an example of FIG. 5) such that the individual droplet discharge devices 1 are able to move in the Z direction (and the X direction) independently of one another.

With the above-described droplet discharge device 1 according to Embodiment 1, since the plunger 7 having the smaller diameter than the liquid chamber is operated to reciprocate by employing the piezoelectric actuator as a drive source, it is possible to realize continuous discharge of very small flying droplets at a high tact (e.g., several hundred to ten thousand shots per second).

Moreover, with the provision of the lever mechanism for increasing the amount of displacement of the piezoelectric actuator, the amount of displacement can be efficiently increased and the distance through which the plunger is moved forward can be ensured even when the piezoelectric element having a relatively small size is employed.

In addition, since the leaf spring absorbs the shock generated upon the seating of the plunger, the service lifetimes of the plunger and the piezoelectric actuator can be prolonged.

Embodiment 2

A droplet discharge device 1 according to Embodiment 2 is different from the droplet discharge device according to Embodiment 1 in including a discharge control device 10 with a function of predicting the lifetimes of the piezoelectric elements 4a and 4b, a sensor box 14, and a swinging mechanism (27, 28) disposed between the mounting surface 21 and each of the piezoelectric elements 4a and 4b. In the following, different points from Embodiment 1 are mainly described, and description of similar components is omitted. In drawings representing Embodiment 2, the similar components to those in Embodiment 1 are denoted by the same reference signs.

Figure 6:
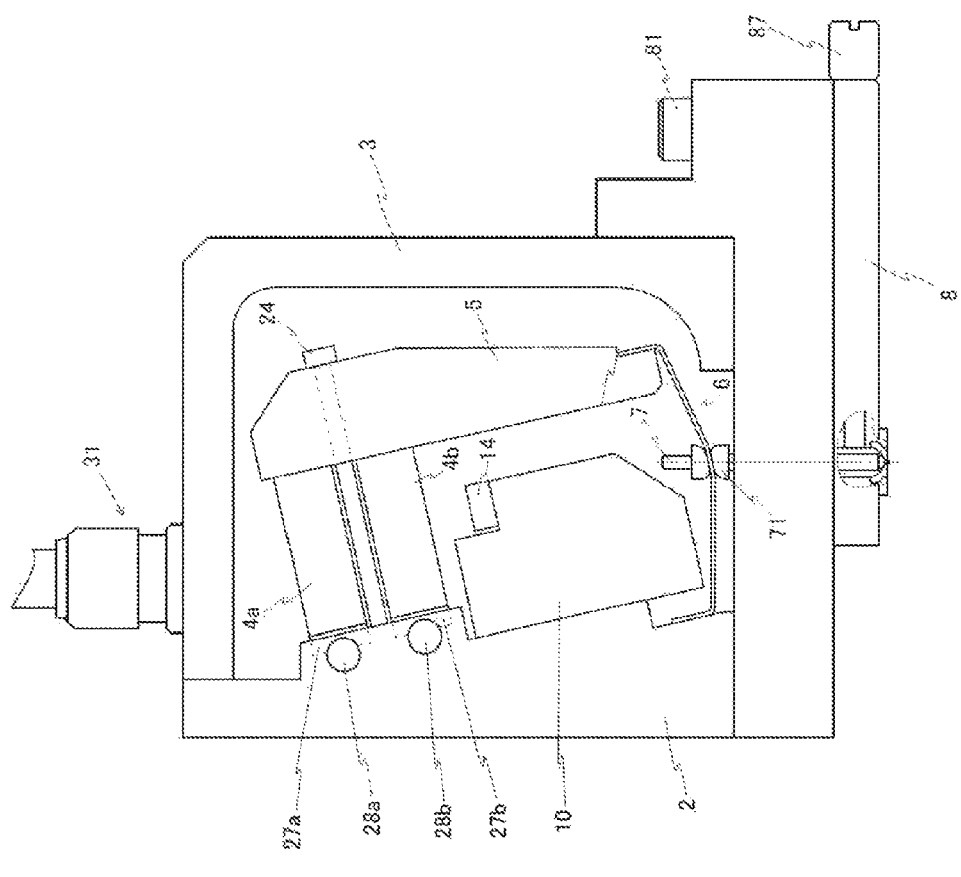
FIG. 6 is a side sectional view of a droplet discharge device according to Embodiment 2.
Figure 7:
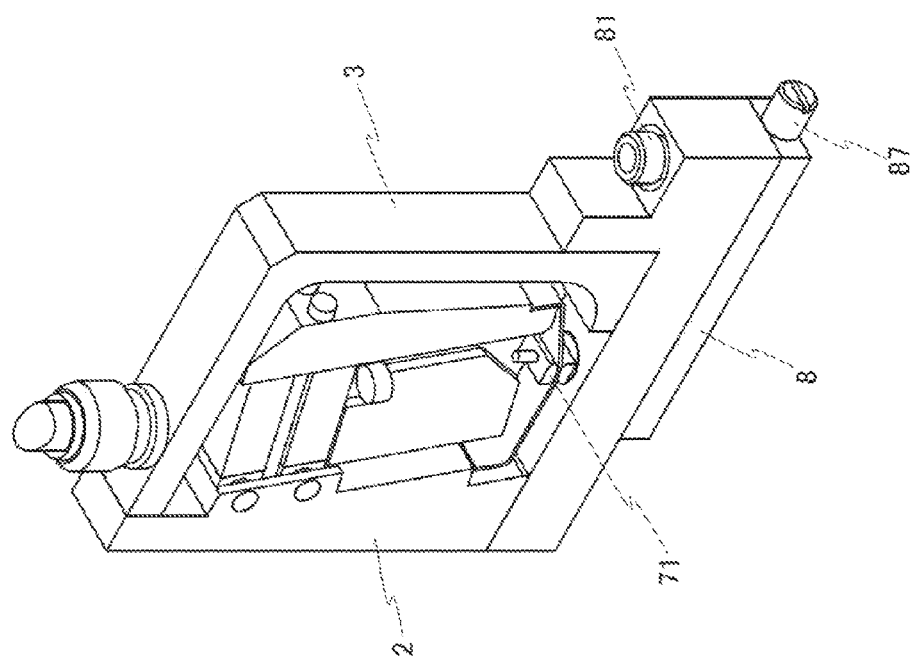
FIG. 7 is a perspective view of the droplet discharge device according to Embodiment 2.

FIG. 6 is a side sectional view of the droplet discharge device 1 according to Embodiment 2, and FIG. 7 is a perspective view of the same. It is to be noted that, although a cable connector 31 is not illustrated in FIG. 1, the droplet discharge device 1 according to Embodiment 1 also includes the cable connector.

The swinging mechanism (27, 28) is a mechanism for absorbing a shearing deformation of one of the piezoelectric elements 4a and 4b, the shearing deformation being generated with the extension of the other piezoelectric element.

An end portion of the piezoelectric element 4a on the side opposite to the arm 5 is fixed to a link stand 27a, and an end portion of the piezoelectric element 4b on the side opposite to the arm 5 is fixed to a link stand 27b. The link stand 27a includes a recess in contact with a roller 28a, and the link stand 27b includes a recess in contact with a roller 28b. Each link stand is swingable along a lateral peripheral surface of the corresponding roller. The arm 5, the piezoelectric elements (4a, 4b), and the link stands (27a, 27b) are fixedly held by the fixation rod 24 in a state where pressing force is applied to the rollers (28a, 28b) from the arm.

Figure 8:
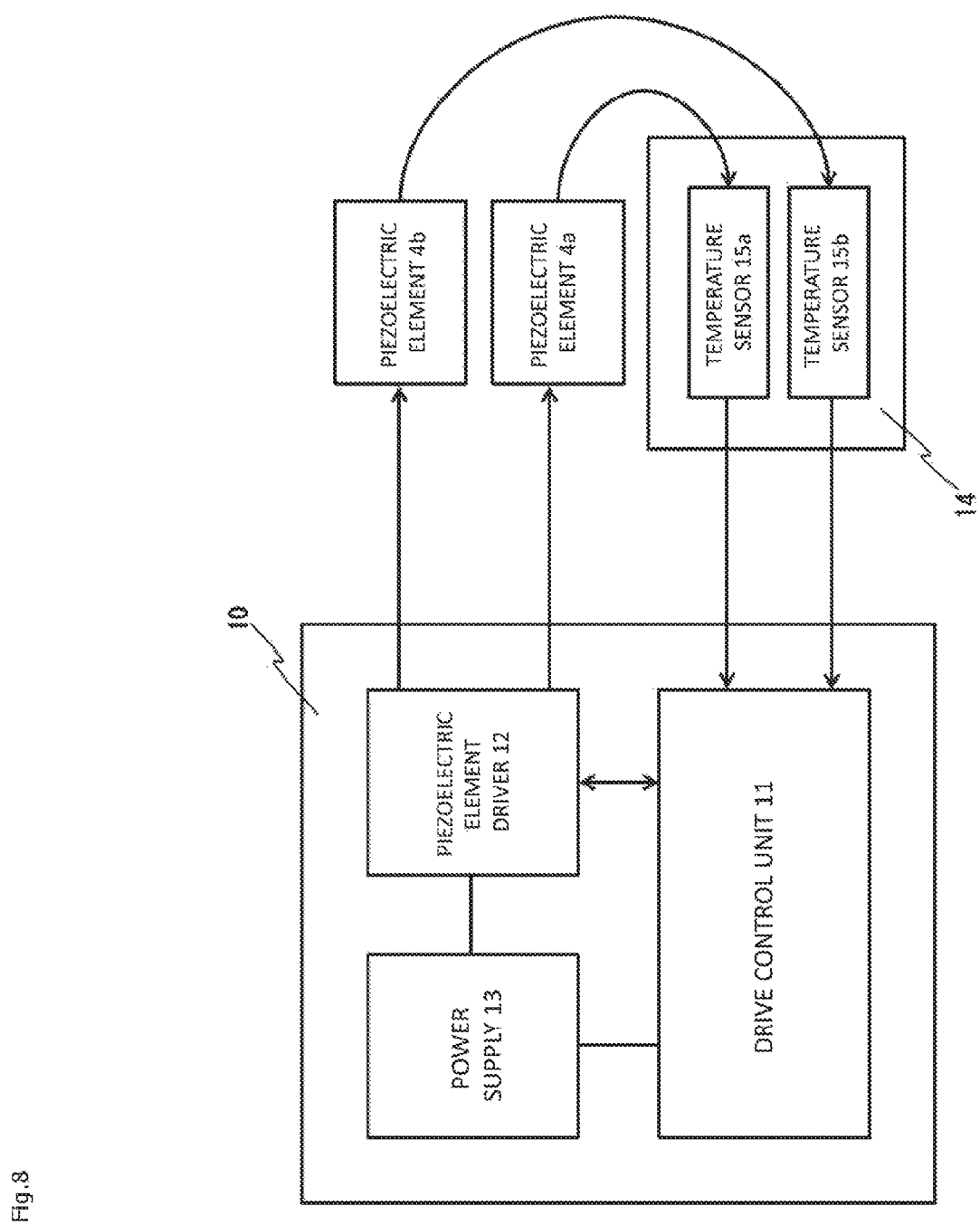
FIG. 8 is a block diagram referenced to explain a control system in the droplet discharge device according to Embodiment 2.

FIG. 8 is a block diagram referenced to explain a control system in the droplet discharge device 1 according to Embodiment 2.

The discharge control device 10 includes a drive control unit 11 for controlling a pulse signal pattern, a drive time, and a drive voltage that are used to drive each piezoelectric element, a piezoelectric element driver 12 for applying pulse signals in predetermined patterns to the piezoelectric elements 4a and 4b, and a power supply 13 for generating voltages to drive the piezoelectric elements.

The drive control unit 11 is connected to the sensor box 14 via signal cables, and it receives temperature information from temperature sensors 15a and 15b. The temperature sensor 15a measures an ambient temperature and a surface temperature of the piezoelectric element 4a, and the temperature sensor 15b measures an ambient temperature and a surface temperature of the piezoelectric element 4b. The drive control unit 11 is connected to an input device (not illustrated) through which commands from an operator are input, and to an output device (not illustrated) that displays and issues control information.

FIG. 9(a) is a circuit diagram of the piezoelectric element driver 12, and FIG. 9(b) is a graph depicting timings of supplying power to the piezoelectric elements 4a and 4b.

The piezoelectric element driver 12 includes a first drive circuit for driving the piezoelectric element 4a, and a second drive circuit for driving the piezoelectric element 4b. The first drive circuit includes a first transistor 41a connected to the power supply, a second transistor 42a of which emitter is grounded, and a voltage monitoring circuit 43a. In the first drive circuit, when power is supplied to the piezoelectric element 4a to extend the piezoelectric element 4a, the first transistor 41a is turned ON and a voltage (e.g., 50 to 200 V) from the power supply 13 is supplied to the piezoelectric element 4a. Electrical charges are accumulated in the piezoelectric element 4a after power supply thereto. Accordingly, in order to bring the piezoelectric element 4a into a state not supplied with power, the second transistor 42a is turned ON to discharge the accumulated electrical charges, and the displacement of the piezoelectric element 4a is returned to an initial position. The voltage monitoring circuit 43a transmits a monitoring signal, which has been obtained by measuring the voltage of the piezoelectric element 4a, to the drive control unit 11.

A configuration and an operation of the second drive circuit are similar to those of the first drive circuit.

The drive control unit 11 has the function of predicting respective lifetimes of the piezoelectric elements 4a and 4b on the basis of temperature information obtained from the temperature sensors 15a and 15b. The lifetime prediction function utilizes the fact that a lifetime coefficient of each piezoelectric element is changed depending on the ambient temperature and heating from the piezoelectric element, and the lifetime prediction function is carried out with execution of a program.

Figure 10:
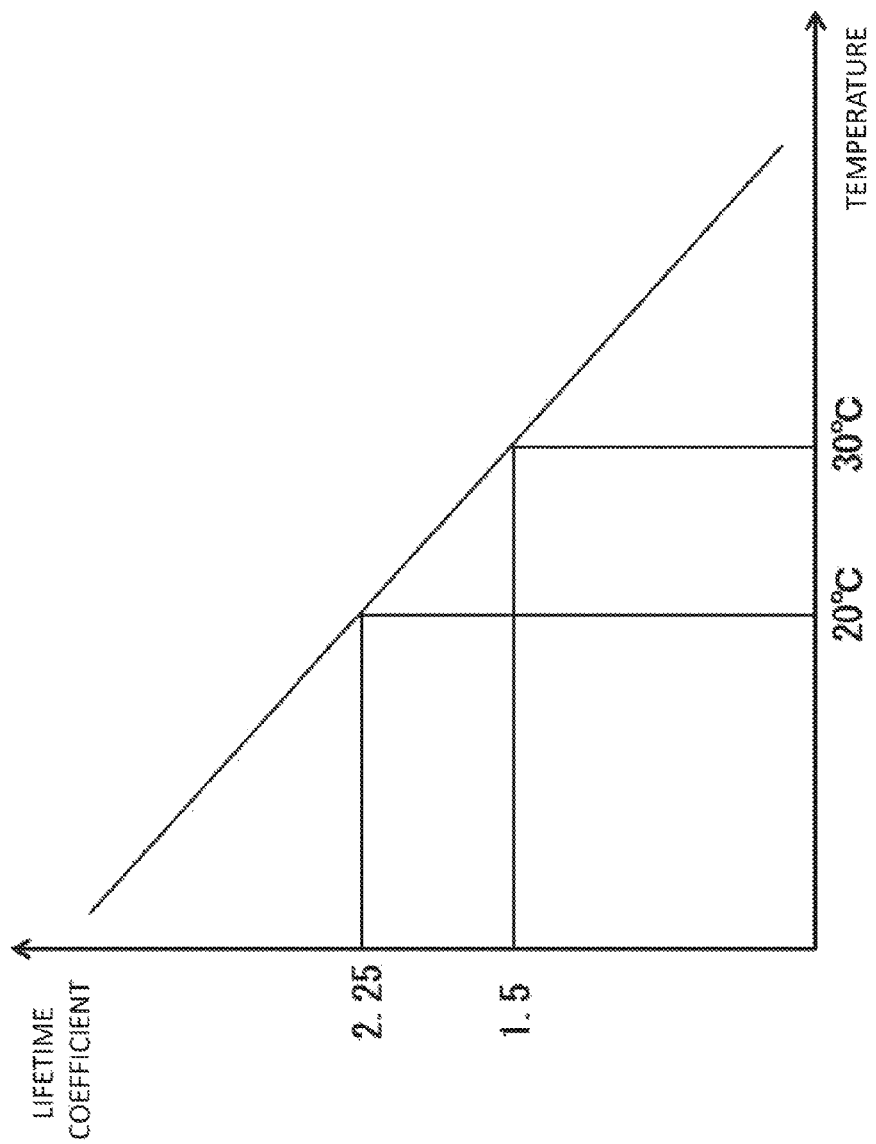
FIG. 10 is a graph depicting an example of changes in temperature of the piezoelectric element and a lifetime coefficient.

FIG. 10 is a graph depicting an example of changes in temperature of the piezoelectric element and a lifetime coefficient. As seen from FIG. 10, the lifetime of the piezoelectric element when driven at 20° C. is 1.5 time that of the piezoelectric element when driven at 30° C. It is generally known that the lifetime of the piezoelectric element is given as a period corresponding to operation cycles of 500,000,000 to 1,000,000,000.

Figure 11:
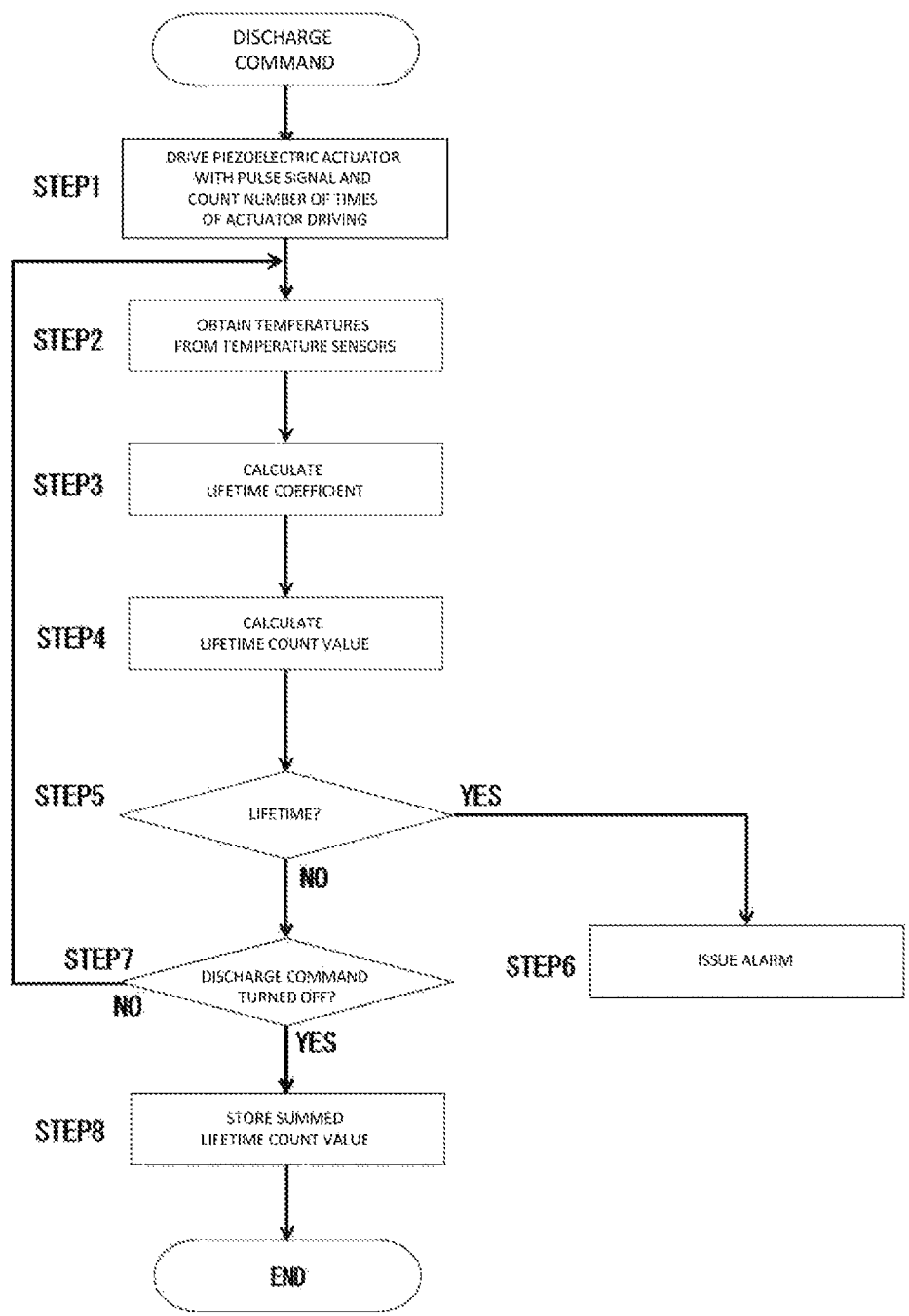
FIG. 11 is a processing flow for a lifetime prediction function of a discharge control device.

FIG. 11 is a processing flow for the lifetime prediction function of the discharge control device.

When a discharge command is given from the operator through the input device of the droplet discharge device 1, the drive control unit 11 transmits the drive pulse signal to the piezoelectric actuator, counts the number of times that the piezoelectric actuator has been driven, and then stores a count value in a storage device (STEP 1). The drive control unit 11 obtains surface temperatures of the piezoelectric elements 4a and 4b on the basis of the measured signals from the temperature sensors 15a and 15b (STEP 2). The drive control unit 11 calculates (in STEP 3) the current lifetime coefficient on the basis of both a table representing the relation between the temperature of the piezoelectric element and the lifetime coefficient, the table being previously recorded in the storage device, and the temperature measured in STEP 2.

The drive control unit 11 multiplies the calculated current lifetime coefficient by the count value and adds a resultant value to a lifetime count value (STEP 4). The lifetime count value is calculated by summing the count value that has been corrected using the lifetime coefficient. By way of example, when the temperature is 40° C. and the count value is 1000, the count value is corrected to 900, and when the temperature is 60° C. and the count value is 1000, the count value is corrected to 1100. Then, the corrected count value is added to the lifetime count value. The drive control unit 11 compares the resultant lifetime count value with a lifetime alarm value, which is previously recorded in the storage device (STEP 5), and issues an alarm from the output device if the lifetime count value is equal to or larger than the lifetime alarm value. If the lifetime count value is smaller than the lifetime alarm value in STEP 5, the above-mentioned processing from STEP 2 to STEP 5 is continuously executed until the discharge command is turned OFF. At timing of the discharge command being turned OFF, the lifetime count value having been summed up to that timing is stored (STEP 8).

The drive control unit 11 further includes a function (program) of monitoring a load applied to the piezoelectric actuator.

Figure 12:
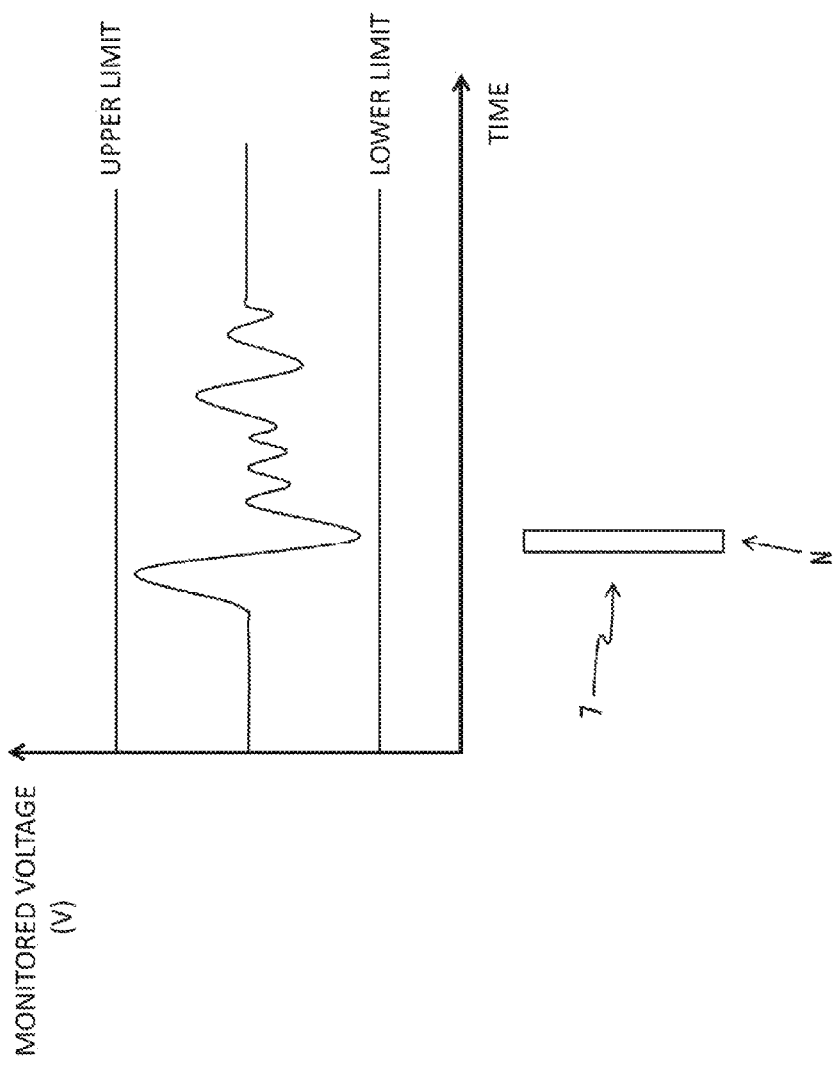
FIG. 12 is a graph depicting a monitored voltage signal detected by a voltage monitoring circuit when external force N acting in a direction denoted by an arrow is applied to the plunger.

FIG. 12 is a graph depicting a monitored voltage signal detected by the voltage monitoring circuit 43 when external force N acting in a direction denoted by an arrow is applied to the plunger 7 in a state where the nozzle unit 9 is removed. The monitored voltage signal is a signal obtained by measuring electromotive force that is generated depending on a load when the load is applied to the piezoelectric element 4. If the monitored voltage signal exceeds an upper limit value or a lower limit value of the monitored voltage signal, those limit values being previously stored in the storage device, the drive control unit 11 issues an alarm from the output device. With the load monitoring function described above, the piezoelectric actuator can be used within a range of the recommended withstand load.

With the above-described droplet discharge device 1 according to Embodiment 2, since shearing deformations of the piezoelectric elements 4a and 4b are absorbed by the swinging mechanism (27, 28), the swinging motion of the arm 5 can be stabilized, and hence discharge accuracy can be improved.

Furthermore, since the droplet discharge device has the function of predicting the lifetime of the piezoelectric actuator, an unintended failure can be prevented from occurring during the operation.

In addition, since the droplet discharge device has the function of monitoring the load applied to the piezoelectric actuator, it is possible to avoid the piezoelectric actuator from being damaged due to an excessive load, and to detect an output fall of the piezoelectric actuator.

Embodiment 3

A droplet discharge device 1 according to Embodiment 3 is different from the droplet discharge device according to Embodiment 1 mainly in that the central portion of the leaf spring 6 is angularly bent in a shape projecting upward (i.e., toward the opposite side to the nozzle). In the following, different points from Embodiment 1 are mainly described, and description of similar components is omitted. In drawings representing Embodiment 3, the similar components to those in Embodiment 1 are denoted by the same reference signs.

<Discharge Device>

The droplet discharge device 1 according to Embodiment 3, schematically illustrated in FIG. 13, includes, as main components, a base 2, a frame 3 (not illustrated), a piezoelectric actuator (4a, 4b), an arm 5, a leaf spring 6, a plunger 7 reciprocating in the vertical direction, a liquid feed member 8, and a nozzle unit 9.

The base 2 includes a mounting surface 21 having an upper portion that is positioned closer to a center line of the plunger 7, and a lower portion that is positioned farther away from the center line of the plunger 7. In other words, the mounting surface 21 forms an acute angle with respect to an extension of the center line of the plunger 7 (i.e., an acute angle with respect to the vertical line).

The frame 3 (not illustrated) is similar to that in Embodiment 1.

The piezoelectric actuator (4a, 4b) is similar to that in Embodiment 1 and is fixedly held by a fixation rod 24.

The arm 5 is arranged substantially parallel to the mounting surface 21. Thus, in the illustrated case, the arm 5 forms an acute angle with respect to the extension of the center line of the plunger 7 (i.e., an acute angle with respect to the vertical line).

The leaf spring 6 is fixedly held in a state where a linked portion 72 to the arm 5 is positioned at a level lower than a linked portion 73 to the base 2. The leaf spring 6 is angularly bent near a position where a plunger fixture 71 is attached to the leaf spring 6, and a central portion of the leaf spring 6 is projected upward (toward the opposite side to the nozzle) (namely, the central portion of the leaf spring 6 is projected toward the opposite side to the nozzle with respect to a linear line interconnecting the linked portion 72 between the leaf spring 6 and the arm 5 and the linked portion 73 between the leaf spring 6 and the base 2). As an alternative, the leaf spring 6 having a circular-arc shape curved to project upward (toward the opposite side to the nozzle) without including any angularly bent portion may be used instead unlike this embodiment.

A relation in height between both the end portions (linked portions 72 and 73) of the leaf spring 6 is not limited to that in the illustrated embodiment. Insofar as the plunger 7 is able to reciprocate linearly, the linked portion 72 may be arranged at a higher position than the linked portion 73, or the linked portion 72 and the linked portion 73 may be arranged at the same height.

The plunger 7, the liquid feed member 8, and the nozzle unit 9 are similar to those in Embodiment 1.

<Operation>

FIG. 13 is a schematic side view referenced to explain a reciprocating motion of the plunger 7.

Figures 13A, 13B:
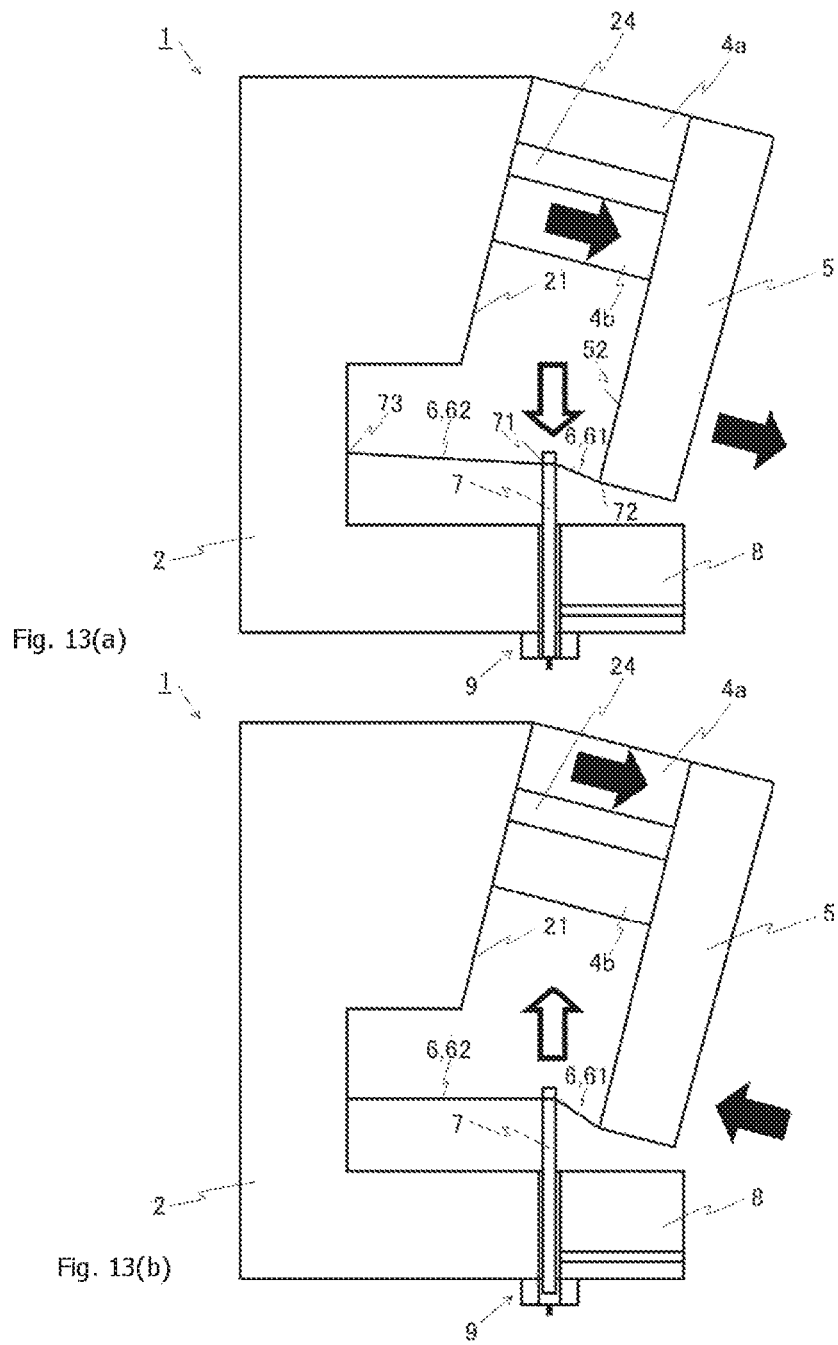
FIGS. 13(a) and 13(b) are a schematic side view referenced to explain a reciprocating motion of a plunger in a droplet discharge device according to Embodiment 3.

As illustrated in FIG. 13(a), with extension of the piezoelectric element 4b, the arm 5 is caused to swing with the fixation rod 24 being a fulcrum point in such a manner that the upper end portion of the arm 5 comes closer to the base 2 and the lower end portion of the arm 5 departs away from the base 2, whereby the plunger 7 is moved downward in the vertical direction.

As illustrated in FIG. 13(b), with extension of the piezoelectric element 4a, the arm 5 is caused to swing with the fixation rod 24 being a fulcrum point in such a manner that the upper end portion of the arm 5 departs away from the base 2 and the lower end portion of the arm 5 comes closer to the base 2, whereby the plunger 7 is moved upward in the vertical direction.

Thus, in this embodiment, the plunger 7 takes the fully advanced position when the arm 6 comes into the farthest position, while the plunger 7 takes the fully retracted position when the arm 6 comes into the closest position (namely, a relation between the position of the arm 5 and the position of the plunger 7 is reversed to that in Embodiment 1).

FIG. 14 is an illustration referenced to explain relations among positions of both the end portions (linked portions 72 and 73) of the leaf spring 6, an attachment angle of the arm 5, and a movement path of the plunger 7. In FIG. 14, it is assumed, as in FIG. 4, that the base 2 is represented by the vertical line, that a direction of the center line of the plunger 7 is aligned with the vertical direction, and that a bottom surface 52 of the arm is a flat surface (in FIG. 14, the reference sign 52 may be regarded as representing a center line of the arm 5).

Figure 14B:
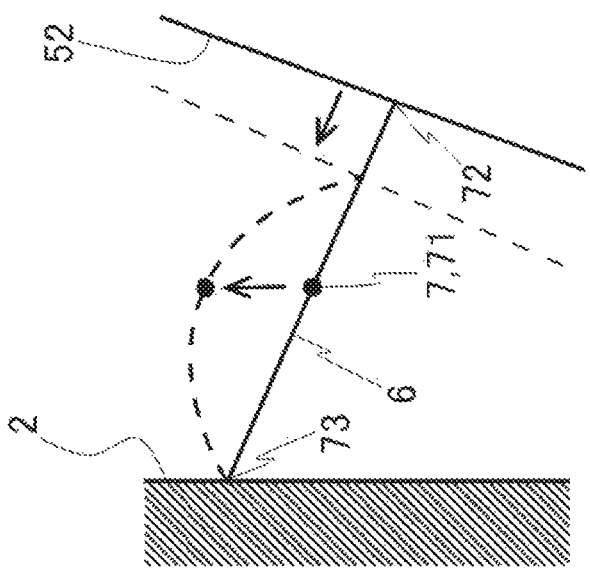
FIGS. 14(a) and 14(b) are an illustration referenced to explain relations among positions of both the end portions of the leaf spring, an attachment angle of the arm, and a movement path of the plunger in Embodiment 3.
Figure 14A:
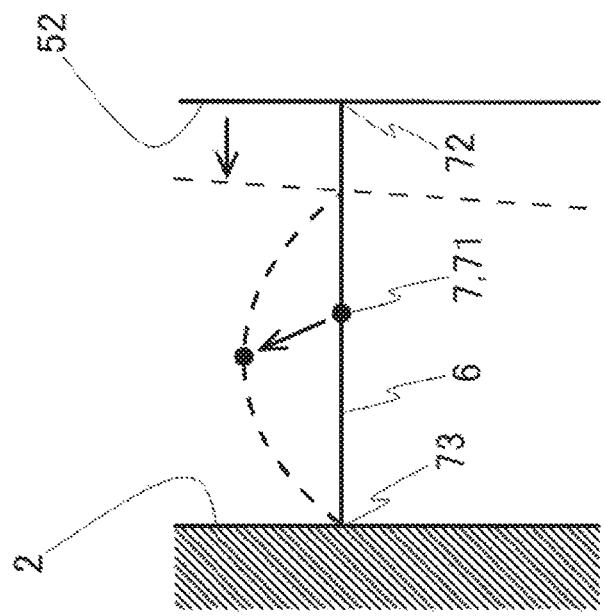

FIG. 14(a) is an illustration referenced to explain a backward movement path of the plunger 7 when both the end portions (linked portions 72 and 73) of the leaf spring 6 are positioned at the same height and when the base 2 and the bottom surface 52 of the arm are parallel to each other at the farthest position (namely, when the arm 5 is parallel to the vertical line at the farthest position). In this case, when the lower end portion of the arm 5 is moved to swing in a direction closer to the base 2 about the fulcrum point defined at the vicinity of the fixation rod 24, the plunger 7 is moved upward obliquely. In other words, the plunger 7 cannot be moved upward in the vertical direction.

FIG. 14(b) is an illustration referenced to explain a backward movement path of the plunger 7 when the heights of both the end portions (linked portions 72 and 73) of the leaf spring 6 are set to levels different from each other through an appropriate distance and when the base 2 and the bottom surface 52 of the arm 5 form an angle (namely, when the arm 5 forms an acute angle with respect to the vertical line at all times, or when the arm 5 forms an acute angle with respect to the extension of the center line of the plunger 7 at all times). In this case, when the lower end portion of the arm 5 is moved to swing in a direction closer to the base 2 about the fulcrum point defined at the vicinity of the fixation rod 24, the plunger 7 is moved upward in the vertical direction.

Thus, the plunger 7 can be operated to reciprocate in the vertical direction with the swinging motion of the arm 5 about the fulcrum point defined at the vicinity of the fixation rod 24 by setting the heights of both the end portions (linked portions 72 and 73) of the leaf spring 6 to levels different from each other through an appropriate distance, and by arranging the arm 5 to form an acute angle with respect to the vertical line (or with respect to the extension of the center line of the plunger 7). During the swinging motion, the arm 5 is not required at all times to form an acute angle with respect to the vertical line (or with respect to the extension of the center line of the plunger 7). The technical concept of the present invention can also be implemented even in an embodiment in which the arm 5 temporarily become parallel to the vertical line (or to the extension of the center line of the plunger 7).

Embodiments 4 and 5

A droplet discharge device 1 according to Embodiment 4 is different from the droplet discharge device 1 according to Embodiment 1 just in that the mounting surface 21 in the form of a flat surface is arranged parallel to the vertical line, and that the arm 5 is arranged substantially parallel to the mounting surface 21.

A droplet discharge device 1 according to Embodiment 5 is different from the droplet discharge device 1 according to Embodiment 3 just in that the mounting surface 21 in the form of a flat surface is arranged parallel to the vertical line, and that the arm 5 is arranged substantially parallel to the mounting surface 21.

Figure 15A:
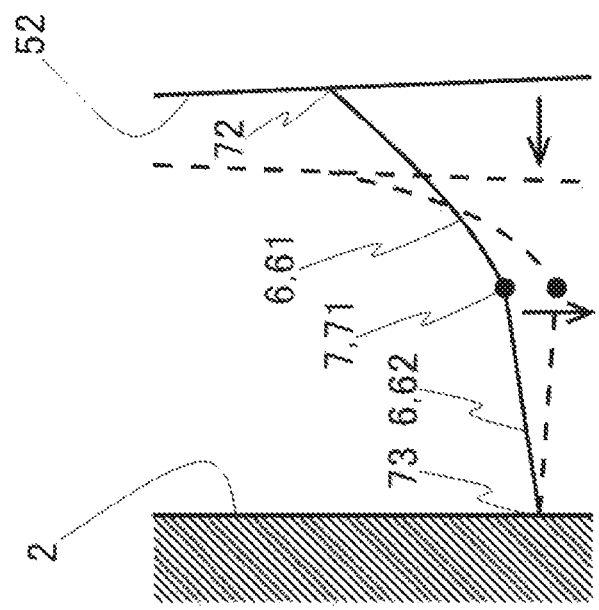
FIGS. 15(a) and 15(b) an illustration referenced to explain relations among positions of both the end portions of the leaf spring, an attachment angle of the arm, and a movement path of the plunger in each of Embodiment 4 and 5.
Figure 15B:
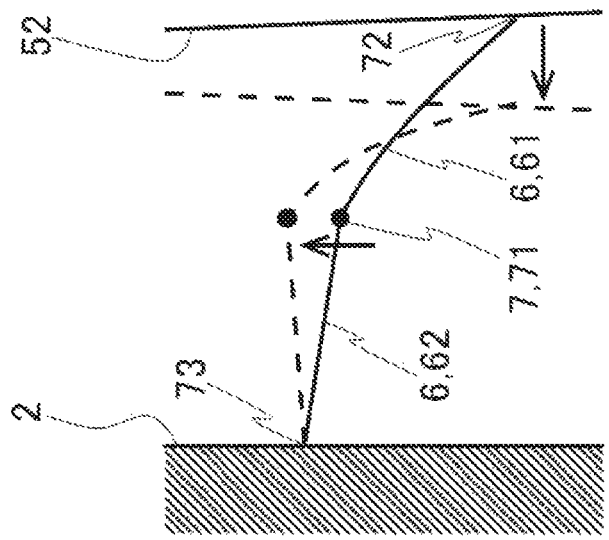

FIG. 15 is an illustration referenced to explain relations among positions of both the end portions (linked portions 72 and 73) of the leaf spring 6, an attachment angle of the arm 5, and a movement path of the plunger 7. FIG. 15(a) represents the movement path of the plunger 7 in Embodiment 4, and FIG. 15(b) represents the movement path of the plunger 7 in Embodiment 5. In FIG. 15, it is assumed, as in FIGS. 4 and 14, that the base 2 is represented by the vertical line, that a direction of the center line of the plunger 7 is aligned with the vertical direction, and that a bottom surface 52 of the arm is a flat surface (in FIG. 15, the reference sign 52 may be regarded as representing a center line of the arm 5).

In the droplet discharge device 1 according to Embodiment 4, as illustrated in FIG. 15(a), the linked portion 72 between the leaf spring 6 and the arm 5 is located at a relatively high position, the linked portion 73 between the leaf spring 6 and the base 2 is located at a relatively low position, and the heights of both the end portions (linked portions 72 and 73) of the leaf spring 6 are set to levels different from each other through an appropriate distance so as to move the plunger 7 in the vertical direction. The arm 5 is mounted such that the base 2 (and the mounting surface 21) and the bottom surface 52 of the arm become parallel to each other midway the movement of the arm 5 from the farthest position to the closest position. When the arm 5 is at the farthest position, the center line of the arm 5 forms an acute angle with respect to the vertical line passing the fulcrum point, the acute angle being open in a first direction (to the right in FIG. 15(a)). When the arm 5 is at the closest position, the center line of the arm 5 forms an acute angle with respect to the vertical line passing the fulcrum point, the acute angle being open in a second direction (to the left in FIG. 15(a)). In Embodiment 4, when the lower end portion of the arm 5 is moved to swing in a direction closer to the base 2 about the fulcrum point defined at the vicinity of the fixation rod 24, the plunger 7 is moved in the vertical direction (forward direction).

In the droplet discharge device 1 according to Embodiment 5, as illustrated in FIG. 15(b), the linked portion 72 between the leaf spring 6 and the arm 5 is located at a relatively low position, the linked portion 73 between the leaf spring 6 and the base 2 is located at a relatively high position, and the heights of both the end portions (linked portions 72 and 73) of the leaf spring 6 are set to levels different from each other through an appropriate distance so as to move the plunger 7 in the vertical direction. The arm 5 is mounted such that the base 2 (and the mounting surface 21) and the bottom surface 52 of the arm become parallel to each other midway the movement of the arm 5 from the farthest position to the closest position. When the arm 5 is at the farthest position, the center line of the arm 5 forms an acute angle with respect to the vertical line passing the fulcrum point, the acute angle being open in a first direction (to the right in FIG. 15(b)). When the arm 5 is at the closest position, the center line of the arm 5 forms an acute angle with respect to the vertical line passing the fulcrum point, the acute angle being open in a second direction (to the left in FIG. 15(b)). In Embodiment 5, when the lower end portion of the arm 5 is moved to swing in a direction closer to the base 2 about the fulcrum point defined at the vicinity of the fixation rod 24, the plunger 7 is moved in the vertical direction (backward direction).

Thus, even in the case where the arm 5 temporarily becomes parallel to the vertical line during the swinging motion, the plunger 7 can be operated to reciprocate in the vertical direction by setting the heights of both the end portions (linked portions 72 and 73) of the leaf spring 6 to levels different from each other through an appropriate distance.

The preferred embodiments of the present invention have been described above, but the technical scope of the present invention is not limited to the matters described in the embodiments. The above embodiments can be variously modified and improved, and those modified and improved embodiments are also included within the technical scope of the present invention.

For instance, while the center line of the plunger 7 is aligned with the vertical direction in each of the embodiments explained in this Description, it is also of course possible to arrange the center line of the plunger 7 in a state inclined with respect to the vertical direction. In that case, the wording "vertical direction" in this Description is to be replaced with "the direction of the center line of the plunger 7", as required, in understanding of the present invention.

INDUSTRIAL APPLICABILITY

The device of the present invention can be utilized in various applications in which very small droplets are to be discharged in a flying state. For instance, the device of the present invention can be used in a primary underfill step in flip-chip mounting, and so on.

LIST OF REFERENCE SIGNS

1: droplet discharge device, 2: base, 3: frame, 4: piezoelectric element, 5: arm, 6: leaf spring, 7: plunger, 8: liquid feed member, 9: nozzle unit, 10: discharge control device, 11: drive control unit, 12: piezoelectric element driver, 13: power supply, 14: sensor box, 15: temperature sensor, 21: mounting surface, 22: rear surface, 23: screw bore, 24: fixation rod, 25: fixation screw (second link member), 26: screw hole, 27: link stand, 28: roller, 31: cable connector, 41: first transistor, 42: second transistor, 43: voltage monitoring circuit, 51: fixation screw (first link member), 52: bottom surface of arm, 53: screw hole, 61: arm-side portion of leaf spring, 62: base-side portion of leaf spring, 72: linked portion between leaf spring and arm (first linked portion), 73: linked portion between leaf spring and base (second linked portion), 71: plunger fixture, 81: joint, 82: inflow channel, 83: air purge channel, 84: supply channel, 85: plunger chamber, 86: sealing member, 87: closing plug, 91: nozzle, 92: liquid chamber, 100: application apparatus, 101: bench, 102: workpiece, 103: worktable, 104: application operation control unit, 111: X drive device, 112: Y drive device, 113: Z drive device, 121: X direction, 122: Y direction, 123: Z direction

The invention claimed is:

1. A droplet discharge device comprising:
a liquid chamber which is in communication with a nozzle and to which a liquid material is supplied;
a plunger having a tip portion that is thinner than the liquid chamber and that is moved back and forth in the liquid chamber;
a piezoelectric actuator serving as a drive source that operates the plunger to be moved back and forth;
a lever mechanism that increases a displacement of the piezoelectric actuator;
a base having a mounting surface to which the piezoelectric actuator is mounted; and
a discharge control device is connected to the piezoelectric actuator,
wherein the lever mechanism includes an arm that is operated to perform a swinging motion by the piezoelectric actuator, and a leaf spring including ends that are linked to a lower portion of the arm and to the base, and a plunger-linked portion in a central region thereof, and
wherein the leaf spring causes the plunger to perform a linear reciprocating motion with the swinging motion of the arm.

2. The droplet discharge device according to claim 1, wherein the arm is arranged such that a center line of the arm at least temporarily forms an acute angle with respect to an extension of a center line of the plunger during the swinging motion.

3. The droplet discharge device according to claim 1, wherein respective center lines of the plunger, the liquid chamber, and the nozzle are positioned on the same linear line.

4. The droplet discharge device according to claim 1, wherein the leaf spring is arranged in a state angularly bent or continuously curved such that a central portion of the leaf spring is projected toward the nozzle side, and
a position of a linked portion between the leaf spring and the arm is located above a position of a linked portion between the leaf spring and the base.

5. The droplet discharge device according to claim 1, wherein the leaf spring is arranged in a state angularly bent or continuously curved such that a central portion of the leaf spring is projected toward the opposite side to the nozzle, and
a position of a linked portion between the leaf spring and the arm is located below a position of a linked portion between the leaf spring and the base.

6. The droplet discharge device according to claim 1, wherein the leaf spring maintains an angularly-bent or continuously-curved state without fully extending when the lower portion of the arm under the swinging motion is located at a position farthest away from the linked portion between the base and the leaf spring.

7. The droplet discharge device according to claim 1, wherein the linked portion between the plunger and the leaf spring is moved to reciprocate across a line perpendicularly extending from the linked portion between the base and the leaf spring toward a center line of the plunger.

8. The droplet discharge device according to claim 1, wherein a distance from the plunger-linked portion of the leaf spring to an end thereof on the base side is set longer than a distance from the plunger-linked portion of the leaf spring to an end thereof on the arm side.

9. The droplet discharge device according to claim 1, wherein a center line of the arm is arranged to form an acute angle with respect to an extension of a center line of the plunger at all times during the swinging motion.

10. The droplet discharge device according to claim 1, wherein the piezoelectric actuator is constituted by a first piezoelectric element that moves a lower end portion of the arm in a direction closer to the base with extension of the first piezoelectric element, and by a second piezoelectric element that moves the lower end portion of the arm in a direction away from the base with extension of the second piezoelectric element.

11. The droplet discharge device according to claim 10, further comprising a fixation rod that is arranged between the first piezoelectric element and the second piezoelectric element, wherein the arm is removably linked to the base by the fixation rod.

12. The droplet discharge device according to claim 10, wherein at least one of the first and second piezoelectric elements is mounted to the base through a roller for absorbing a shearing deformation that is generated in one of the first and second piezoelectric elements with extension of the other piezoelectric element.

13. The droplet discharge device according to claim 1, wherein the discharge control device adjusts forward and backward operations of the plunger by adjusting a rising time and a falling time of a pulse signal, which is used to drive the piezoelectric actuator, without changing an oscillation frequency of the pulse signal.

14. The droplet discharge device according to claim 1, wherein the arm is arranged substantially parallel to the mounting surface.

15. The droplet discharge device according to claim 1, wherein the lever mechanism increases a displacement of the piezoelectric actuator 3 to 20 times.

16. The droplet discharge device according to claim 1, wherein the plunger is seated against an inner wall of the liquid chamber, the inner wall being positioned forward of the plunger when the plunger is brought into a fully advanced position, and the seated plunger cuts off fluid communication between the liquid chamber and the nozzle.

17. The droplet discharge device according to claim 1, further comprising a temperature sensor that measures a temperature of the piezoelectric actuator,
wherein the discharge control device has functions of storing a summed number of times that the piezoelectric actuator has been driven, predicting a lifetime of the piezoelectric actuator on the basis of both the summed number of times of actuator driving and a table representing a relation between a temperature and a lifetime coefficient, the table being stored in advance, and issuing an alarm when the lifetime is predicted to expire soon.

18. The droplet discharge device according to claim 1, wherein the discharge control device has functions of monitoring a load applied to the plunger, and issuing an alarm when the monitored load exceeds a load range that is stored in advance.

19. An application apparatus comprising the droplet discharge device according to claim 1, a worktable on which an application target is placed, a relatively moving device that moves the droplet discharge device and the application target relatively to each other, and a liquid-material supply source that supplies a liquid material to the droplet discharge device.

20. The application apparatus according to claim 19, wherein the droplet discharge device is constituted by a plurality of droplet discharge devices.

* * * * *